US011742775B2

(12) United States Patent
Ishida

(10) Patent No.: US 11,742,775 B2
(45) Date of Patent: Aug. 29, 2023

(54) POWER CONVERSION DEVICE

(71) Applicant: Mitsubishi Electric Corporation, Tokyo (JP)

(72) Inventor: Keisuke Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 332 days.

(21) Appl. No.: 17/283,034

(22) PCT Filed: Nov. 27, 2018

(86) PCT No.: PCT/JP2018/043612

§ 371 (c)(1),
(2) Date: Apr. 6, 2021

(87) PCT Pub. No.: WO2020/110203

PCT Pub. Date: Jun. 4, 2020

(65) Prior Publication Data

US 2022/0038026 A1 Feb. 3, 2022

(51) Int. Cl.

*H02M 7/48* (2007.01)
*H02M 7/483* (2007.01)
*H02M 1/32* (2007.01)

(52) U.S. Cl.

CPC ............. *H02M 7/483* (2013.01); *H02M 1/32* (2013.01)

(58) Field of Classification Search

CPC ................................ H02M 1/32; H02M 7/483
See application file for complete search history.

(56) References Cited

U.S. PATENT DOCUMENTS 10,199,915 B2 * 2/2019 Peyrl ........................ H02M 1/08
2015/0023080 A1 * 1/2015 Chambon ........... H02M 7/4837 327/108
2016/0247641 A1 * 8/2016 Malapelle ................ H01H 9/54
(Continued)

FOREIGN PATENT DOCUMENTS

| EP | 3352363 A1 | 7/2018 |
|---|---|---|
| JP | 2017060358 A | 3/2017 |
| WO | 2017208322 A1 | 12/2017 |

OTHER PUBLICATIONS

International Search Report (PCT/ISA/210) with translation and Written Opinion (PCT/ISA/237) dated Feb. 19, 2019, by the Japan Patent Office as the International Searching Authority for International Application No. PCT/JP2018/043612.

*Primary Examiner* — Rafael O Leon De Domenech
(74) *Attorney, Agent, or Firm* — BUCHANAN INGERSOLL & ROONEY PC

(57) ABSTRACT

A power conversion device converts power between a direct-current (DC) circuit and an alternating-current (AC) circuit. The power conversion device includes a power converter circuit which includes a plurality of unit converters connected in series, and a controller. The unit converter includes one or more switching elements and a capacitor. The controller transmits, to the unit converter through a first transmission medium, information on a switching command for the unit converter. The unit converter transmits, to the controller through a second transmission medium, information on at least one condition of the unit converter. The first transmission medium is an optical fiber, and the second transmission medium is a wireless communication channel.

19 Claims, 13 Drawing Sheets

(56) References Cited

U.S. PATENT DOCUMENTS

| | | | | |
|---|---|---|---|---|
| 2016/0277071 | A1* | 9/2016 | Dzung | H03K 17/605 |
| 2016/0344277 | A1* | 11/2016 | Peyrl | H02M 7/53873 |
| 2016/0352208 | A1* | 12/2016 | Wien | H02M 1/0845 |

* cited by examiner

DC CIRCUIT
AC CIRCUIT
CONTROLLER
SM
14
12
13
16
10
1
2
3
4u
4v
4w
5
6
7
8A
9A
9B
8B
11A
11B
Np
Nn
Nu
Nv
Nw
FC1
RC
Idc
(Vdcp)
(Vdcn)
Ipu, Inu
Ipv, Inv
Ipw, Inw
Iacu
Iacv
Iacw
Vacu
Vacv
Vacw

FIG.3

| INFORMATION | TRANSMISSION MEDIUM |
|---|---|
| SWITCHING COMMAND FOR UNIT CONVERTER | FC1 |
| COMMUNICATIONS ABNORMALITY OR ABNORMALITY IN CONTROLLER | FC1+RC |
| TEST COMMAND FOR UNIT CONVERTER | RC |

FIG.4

| INFORMATION | TRANSMISSION MEDIUM |
|---|---|
| CONDITION OF UNIT CONVERTER WHICH CHANGES ON SWITCHING COMMAND | FC1+RC |
| COMMUNICATION TIMEOUT OR SEVERE ABNORMALITY IN UNIT CONVERTER | FC1+RC |
| INSTANTANEOUS ABNORMALITY IN COMMUNICATIONS OVER OPTICAL FIBER | FC1 |
| SLIGHT ABNORMALITY IN UNIT CONVERTER | RC |
| CONDITION OF UNIT CONVERTER IRRELEVANT TO SWITCHING COMMAND | RC |

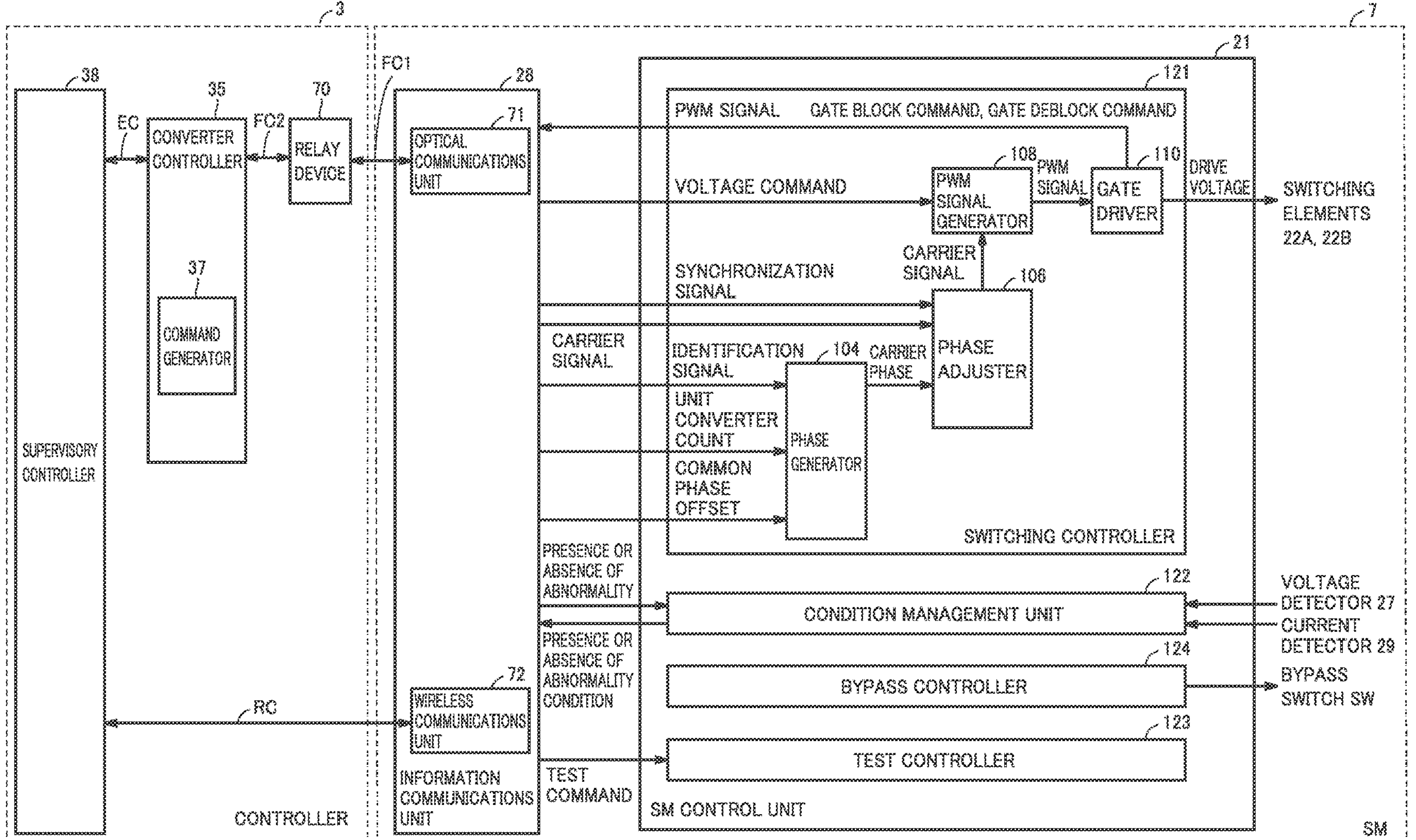
FIG.5
3
38
SUPERVISORY CONTROLLER
EC
35
CONVERTER CONTROLLER
37
COMMAND GENERATOR
FC2
70
RELAY DEVICE
CONTROLLER
RC
7
FC1
28
71
OPTICAL COMMUNICATIONS UNIT
72
WIRELESS COMMUNICATIONS UNIT
INFORMATION COMMUNICATIONS UNIT
21
121
PWM SIGNAL GATE BLOCK COMMAND, GATE DEBLOCK COMMAND
VOLTAGE COMMAND
108
PWM SIGNAL GENERATOR
PWM SIGNAL
110
GATE DRIVER
DRIVE VOLTAGE
SWITCHING ELEMENTS 22A, 22B
CARRIER SIGNAL
SYNCHRONIZATION SIGNAL
106
PHASE ADJUSTER
CARRIER SIGNAL
IDENTIFICATION SIGNAL
104
CARRIER PHASE
UNIT CONVERTER COUNT
PHASE GENERATOR
COMMON PHASE OFFSET
SWITCHING CONTROLLER
PRESENCE OR ABSENCE OF ABNORMALITY
122
CONDITION MANAGEMENT UNIT
VOLTAGE DETECTOR 27
CURRENT DETECTOR 29
PRESENCE OR ABSENCE OF ABNORMALITY CONDITION
124
BYPASS CONTROLLER
BYPASS SWITCH SW
123
TEST CONTROLLER
TEST COMMAND
SM CONTROL UNIT
SM Vdcp, Vdcn
Ipu, Ipv, Ipw
Inu, Inv, Inw
Vacu, Vacv, Vacw
Iacu, Iacv, Iacw
Vcap
Ipu, Ipv, Ipw
Inu, Inv, Inw
37
60
DC VOLTAGE CONTROLLER
61
AC VOLTAGE CONTROLLER
62
CIRCULATING CURRENT CONTROLLER
63
CAPACITOR VOLTAGE CONTROLLER
COMMAND GENERATOR
64
ARM VOLTAGE COMMAND GENERATOR
VOLTAGE COMMAND
Vprefu
Vnrefu
Vprefv
Vnrefv
Vprefw
Vnrefw

FIG. 7

| | PATH | FRAME | ITEM |
|---|---|---|---|
| FIRST SWITCHING COMMAND FOR UNIT CONVERTER | CONVERTER CONTROLLER→ RELAY DEVICE→UNIT CONVERTER (FC2, FC1) | FD1 | VOLTAGE COMMAND |
| | | | CARRIER SIGNAL |
| | | | PULSE SIGNAL |
| | | | SYNCHRONIZATION SIGNAL |
| SECOND SWITCHING COMMAND FOR UNIT CONVERTER | CONVERTER CONTROLLER→ RELAY DEVICE→UNIT CONVERTER (FC2, FC1) | FD2 | IDENTIFICATION SIGNAL |
| | | | COMMON PHASE OFFSET |
| | | | UNIT CONVERTER COUNT |
| THIRD SWITCHING COMMAND FOR UNIT CONVERTER | SUPERVISORY CONTROLLER→CONVERTER CONTROLLER→RELAY DEVICE→UNIT CONVERTER (EC, FC2, FC1) | FD3 | GATE BLOCK COMMAND |
| | | | GATE DEBLOCK COMMAND |
| COMMUNICATIONS ABNORMALITY OR ABNORMALITY IN CONTROLLER | SUPERVISORY CONTROLLER→ CONVERTER CONTROLLER→ RELAY DEVICE→UNIT CONVERTER (EC, FC2, FC1), SUPERVISORY CONTROLLER→ UNIT CONVERTER (RC) | FD4 | PRESENCE OR ABSENCE OF CRC ERROR |
| | | FD5 | PRESENCE OR ABSENCE OF NON-DETECTION OF LIGHT QUANTITY |
| | | | PRESENCE OR ABSENCE OF COMMUNICATION TIMEOUT |
| | | | PRESENCE OR ABSENCE OF ABNORMALITY IN SUPERVISORY CONTROLLER |
| | | | PRESENCE OR ABSENCE OF ABNORMALITY IN CONVERTER CONTROLLER |
| TEST COMMAND FOR UNIT CONVERTER | SUPERVISORY CONTROLLER→ UNIT CONVERTER (RC) | FD6 | START TESTING COMMAND |
| | | | ON/OFF COMMAND FOR EACH SWITCHING ELEMENT |
| | | | GATE BLOCK COMMAND |
| | | | GATE DEBLOCK COMMAND |
| | | | BYPASSING COMMAND |
| | | | SIMULATING COMMAND FOR EACH COMMUNICATION DATA |

Figure 8:
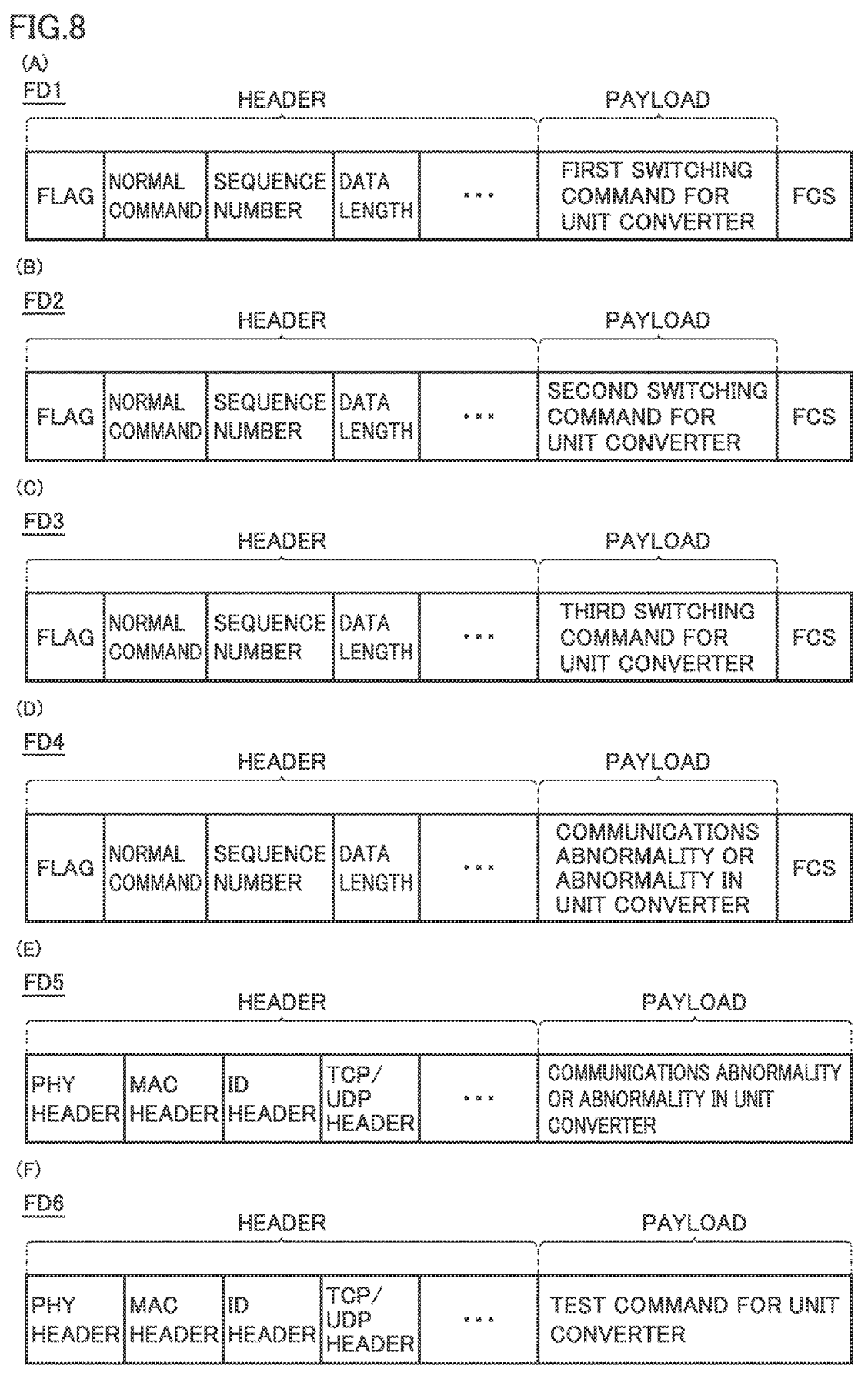

| HEADER | | | | | PAYLOAD | |
|---|---|---|---|---|---|---|
| FLAG | NORMAL COMMAND | SEQUENCE NUMBER | DATA LENGTH | ... | FIRST SWITCHING COMMAND FOR UNIT CONVERTER | FCS |

(B)

FD2

| HEADER | | | | | PAYLOAD | |
|---|---|---|---|---|---|---|
| FLAG | NORMAL COMMAND | SEQUENCE NUMBER | DATA LENGTH | ... | SECOND SWITCHING COMMAND FOR UNIT CONVERTER | FCS |

(C)

FD3

| HEADER | | | | | PAYLOAD | |
|---|---|---|---|---|---|---|
| FLAG | NORMAL COMMAND | SEQUENCE NUMBER | DATA LENGTH | ... | THIRD SWITCHING COMMAND FOR UNIT CONVERTER | FCS |

(D)

FD4

| HEADER | | | | | PAYLOAD | |
|---|---|---|---|---|---|---|
| FLAG | NORMAL COMMAND | SEQUENCE NUMBER | DATA LENGTH | ... | COMMUNICATIONS ABNORMALITY OR ABNORMALITY IN UNIT CONVERTER | FCS |

(E)

FD5

| HEADER | | | | | PAYLOAD |
|---|---|---|---|---|---|
| PHY HEADER | MAC HEADER | ID HEADER | TCP/UDP HEADER | ... | COMMUNICATIONS ABNORMALITY OR ABNORMALITY IN UNIT CONVERTER |

(F)

FD6

| HEADER | | | | | PAYLOAD |
|---|---|---|---|---|---|
| PHY HEADER | MAC HEADER | ID HEADER | TCP/UDP HEADER | ... | TEST COMMAND FOR UNIT CONVERTER |

FIG.9

| | PATH | FRAME | ITEM |
|---|---|---|---|
| FIRST CONDITION OF UNIT CONVERTER WHICH CHANGES ON SWITCHING COMMAND | UNIT CONVERTER→RELAY DEVICE (FC1)<br>UNIT CONVERTER→SUPERVISORY CONTROLLER (RC) | FU1<br>FU2 | CAPACITOR VOLTAGE |
| | | | PASSING CURRENT |
| SECOND CONDITION OF UNIT CONVERTER WHICH CHANGES ON SWITCHING COMMAND | UNIT CONVERTER→RELAY DEVICE (FC1)<br>UNIT CONVERTER→ SUPERVISORY CONTROLLER (RC) | FU3<br>FU4 | OPERATIONAL STATE |
| | | | GATE-BLOCKED STATE |
| | | | GATE-DEBLOCKED STATE |
| COMMUNICATION TIMEOUT OR SEVERE ABNORMALITY IN UNIT CONVERTER | UNIT CONVERTER→ RELAY DEVICE (FC1)<br>UNIT CONVERTER→ SUPERVISORY CONTROLLER (RC) | FU5<br>FU6 | PRESENCE OR ABSENCE OF COMMUNICATION TIMEOUT |
| | | | PRESENCE OR ABSENCE OF ABNORMALITY IN POWER SUPPLY FOR UNIT CONVERTER |
| | | | PRESENCE OR ABSENCE OF ABNORMALITY IN CLOCK INCLUDED IN UNIT CONVERTER |
| | | | PRESENCE OR ABSENCE OF SEVERE ABNORMALITY IN CAPACITOR VOLTAGE |
| AGGREGATION OF FIRST CONDITIONS OF UNIT CONVERTERS WHICH CHANGE ON SWITCHING COMMAND | RELAY DEVICE→CONVERTER CONTROLLER →SUPERVISORY CONTROLLER (FC2, EC) | FU7 | SUM OR AVERAGE OF CAPACITOR VOLTAGES |
| | | | SUM OR AVERAGE OF PASSING CURRENTS |
| AGGREGATION OF SECOND CONDITIONS OF UNIT CONVERTERS WHICH CHANGE ON SWITCHING COMMAND | RELAY DEVICE→CONVERTER CONTROLLER→SUPERVISORY CONTROLLER (FC2, EC) | FU8 | LOGICAL AND OF OPERATIONAL STATES |
| | | | LOGICAL AND OF GATE-BLOCKED STATES |
| | | | LOGICAL AND OF GATE-DEBLOCKED STATES |
| AGGREGATION OF COMMUNICATION TIMEOUTS OR SEVERE ABNORMALITIES IN UNIT CONVERTERS | RELAY DEVICE→ CONVERTER CONTROLLER→ SUPERVISORY CONTROLLER (FC2, EC) | FU9 | LOGICAL OR OF PRESENCE OR ABSENCE OF COMMUNICATION TIMEOUTS |
| | | | LOGICAL OR OF PRESENCE OR ABSENCE OF ABNORMALITIES IN POWER SUPPLY FOR UNIT CONVERTERS |
| | | | LOGICAL OR OF PRESENCE OR ABSENCE OF ABNORMALITIES IN CLOCK INCLUDED IN UNIT CONVERTERS |
| | | | LOGICAL OR OF PRESENCE OR ABSENCE OF SEVERE ABNORMALITIES IN CAPACITOR VOLTAGE |
| INSTANTANEOUS ABNORMALITY IN COMMUNICATIONS OVER OPTICAL FIBER | UNIT CONVERTER→ RELAY DEVICE (FC1) | FU10 | PRESENCE OR ABSENCE OF CRC ERROR |
| | | | PRESENCE OR ABSENCE OF FCS ERROR |
| | | | PRESENCE OR ABSENCE OF NON-DETECTION OF LIGHT QUANTITY |
| AGGREGATION OF INSTANTANEOUS ABNORMALITIES IN COMMUNICATIONS OVER OPTICAL FIBERS | RELAY DEVICE→CONVERTER CONTROLLER→SUPERVISORY CONTROLLER (FC2, EC) | FU11 | LOGICAL OR OF PRESENCE OR ABSENCE OF CRC ERRORS |
| | | | LOGICAL OR OF PRESENCE OR ABSENCE OF FCS ERRORS |
| | | | LOGICAL OR OF PRESENCE OR ABSENCE OF NON-DETECTIONS OF LIGHT QUANTITIES |
| SLIGHT ABNORMALITY IN UNIT CONVERTER | UNIT CONVERTER→ SUPERVISORY CONTROLLER (RC) | FU12 | PRESENCE OR ABSENCE OF ABNORMALITY IN RECORDING FUNCTIONALITY |
| | | | PRESENCE OR ABSENCE OF SLIGHT EXCESS OF CAPACITOR VOLTAGE |
| | | | PRESENCE OR ABSENCE OF SLIGHT DEFICIT IN CAPACITOR VOLTAGE |
| CONDITION OF UNIT CONVERTER IRRELEVANT TO SWITCHING COMMAND | UNIT CONVERTER→ SUPERVISORY CONTROLLER (RC) | FU13 | CONDITIONS OF SWITCHING ELEMENTS |
| | | | CONDITION OF BYPASS SWITCH |
| | | | ANSWERBACK TO SWITCHING COMMAND |
| | | | RECORDED DATA |

Figure 10:
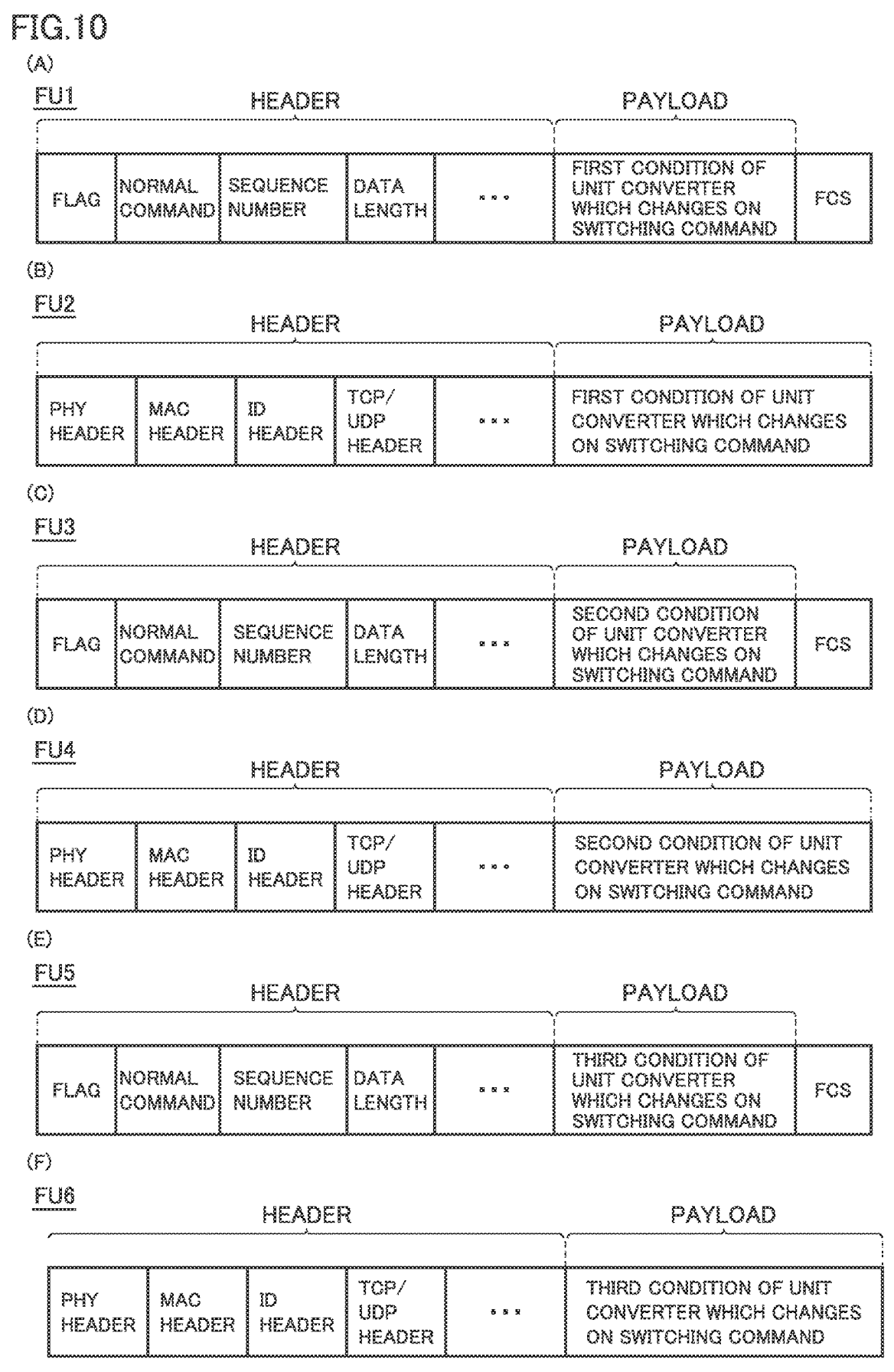

| HEADER | | | | | PAYLOAD | |
|---|---|---|---|---|---|---|
| FLAG | NORMAL COMMAND | SEQUENCE NUMBER | DATA LENGTH | ... | FIRST CONDITION OF UNIT CONVERTER WHICH CHANGES ON SWITCHING COMMAND | FCS |

(B)

FU2

| HEADER | | | | | PAYLOAD |
|---|---|---|---|---|---|
| PHY HEADER | MAC HEADER | ID HEADER | TCP/ UDP HEADER | ... | FIRST CONDITION OF UNIT CONVERTER WHICH CHANGES ON SWITCHING COMMAND |

(C)

FU3

| HEADER | | | | | PAYLOAD | |
|---|---|---|---|---|---|---|
| FLAG | NORMAL COMMAND | SEQUENCE NUMBER | DATA LENGTH | ... | SECOND CONDITION OF UNIT CONVERTER WHICH CHANGES ON SWITCHING COMMAND | FCS |

(D)

FU4

| HEADER | | | | | PAYLOAD |
|---|---|---|---|---|---|
| PHY HEADER | MAC HEADER | ID HEADER | TCP/ UDP HEADER | ... | SECOND CONDITION OF UNIT CONVERTER WHICH CHANGES ON SWITCHING COMMAND |

(E)

FU5

| HEADER | | | | | PAYLOAD | |
|---|---|---|---|---|---|---|
| FLAG | NORMAL COMMAND | SEQUENCE NUMBER | DATA LENGTH | ... | THIRD CONDITION OF UNIT CONVERTER WHICH CHANGES ON SWITCHING COMMAND | FCS |

(F)

FU6

| HEADER | | | | | PAYLOAD |
|---|---|---|---|---|---|
| PHY HEADER | MAC HEADER | ID HEADER | TCP/ UDP HEADER | ... | THIRD CONDITION OF UNIT CONVERTER WHICH CHANGES ON SWITCHING COMMAND |

Figure 11:
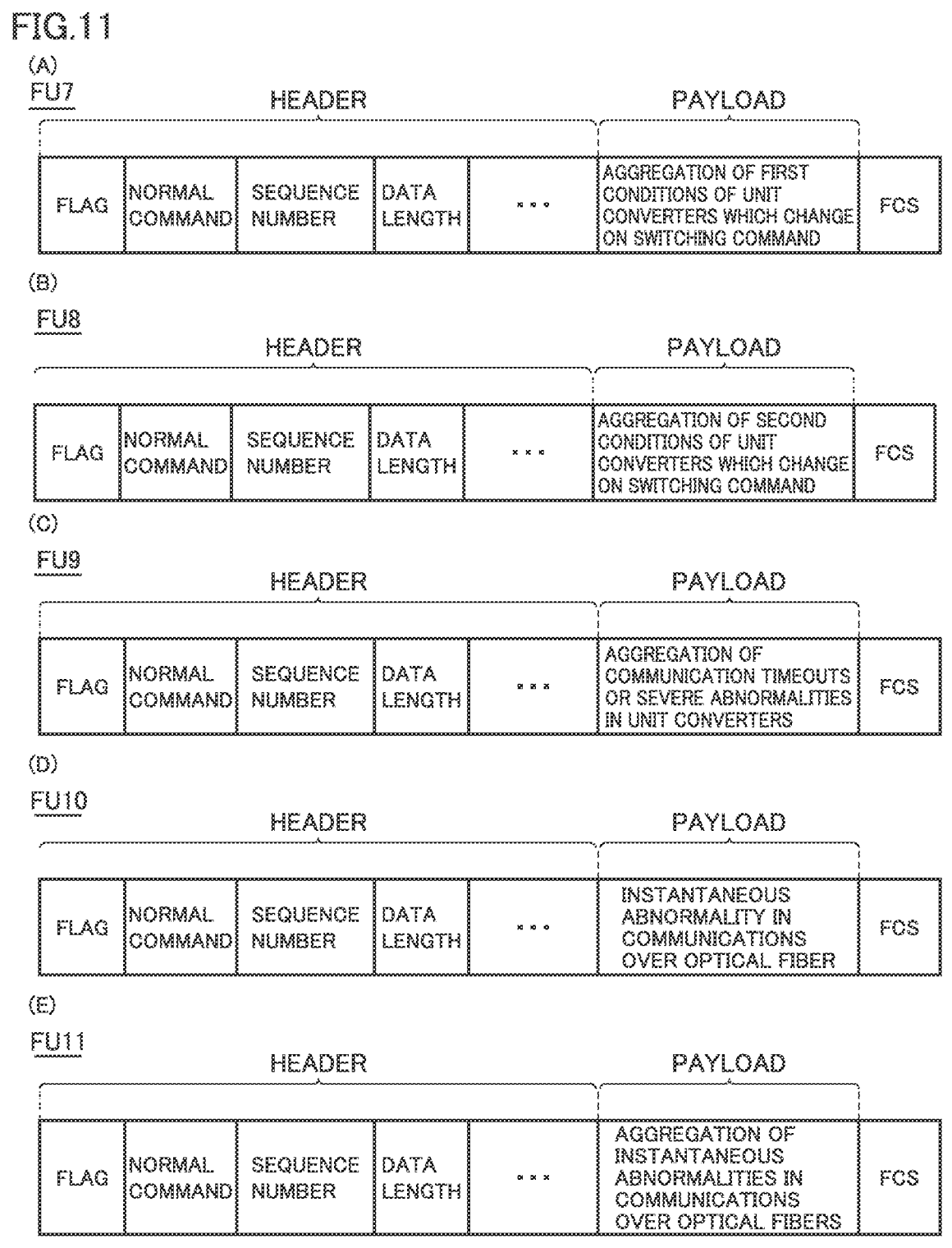

| HEADER | | | | | PAYLOAD | |
|---|---|---|---|---|---|---|
| FLAG | NORMAL COMMAND | SEQUENCE NUMBER | DATA LENGTH | ... | AGGREGATION OF FIRST CONDITIONS OF UNIT CONVERTERS WHICH CHANGE ON SWITCHING COMMAND | FCS |

(B)

FU8

| HEADER | | | | | PAYLOAD | |
|---|---|---|---|---|---|---|
| FLAG | NORMAL COMMAND | SEQUENCE NUMBER | DATA LENGTH | ... | AGGREGATION OF SECOND CONDITIONS OF UNIT CONVERTERS WHICH CHANGE ON SWITCHING COMMAND | FCS |

(C)

FU9

| HEADER | | | | | PAYLOAD | |
|---|---|---|---|---|---|---|
| FLAG | NORMAL COMMAND | SEQUENCE NUMBER | DATA LENGTH | ... | AGGREGATION OF COMMUNICATION TIMEOUTS OR SEVERE ABNORMALITIES IN UNIT CONVERTERS | FCS |

(D)

FU10

| HEADER | | | | | PAYLOAD | |
|---|---|---|---|---|---|---|
| FLAG | NORMAL COMMAND | SEQUENCE NUMBER | DATA LENGTH | ... | INSTANTANEOUS ABNORMALITY IN COMMUNICATIONS OVER OPTICAL FIBER | FCS |

(E)

FU11

| HEADER | | | | | PAYLOAD | |
|---|---|---|---|---|---|---|
| FLAG | NORMAL COMMAND | SEQUENCE NUMBER | DATA LENGTH | ... | AGGREGATION OF INSTANTANEOUS ABNORMALITIES IN COMMUNICATIONS OVER OPTICAL FIBERS | FCS |

Figure 12:
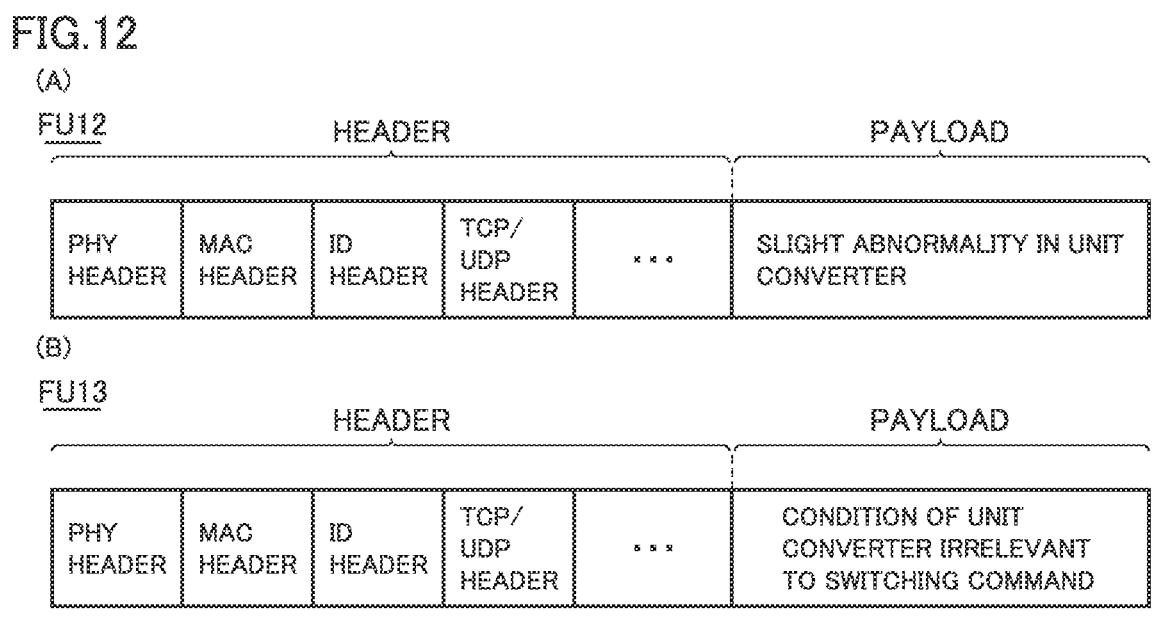

| HEADER | | | | | PAYLOAD |
|---|---|---|---|---|---|
| PHY HEADER | MAC HEADER | ID HEADER | TCP/ UDP HEADER | ... | SLIGHT ABNORMALITY IN UNIT CONVERTER |

(B)

FU13

| HEADER | | | | | PAYLOAD |
|---|---|---|---|---|---|
| PHY HEADER | MAC HEADER | ID HEADER | TCP/ UDP HEADER | ... | CONDITION OF UNIT CONVERTER IRRELEVANT TO SWITCHING COMMAND |

3
530
531
ANALOG FILTER
532
AD CONVERTER
AD CONVERTER UNIT
535
538
BUS I/F
536
CPU
537
MEMORY
539
BUS I/F
540
ARITHMETIC PROCESSING UNIT
543
544
COMMUNICATION CIRCUIT
545
DIGITAL INPUT CIRCUIT
546
DIGITAL OUTPUT CIRCUIT
IO UNIT
547
548
TOUCH PANEL FOR SETTLING AND DISPLAY
SETTLING-AND-DISPLAY UNIT

POWER CONVERSION DEVICE

TECHNICAL FIELD

The present invention relates to a power conversion device.

BACKGROUND ART

In a power conversion device, which includes: a modular multilevel converter in which unit converters are connected in series; and a controller which controls the modular multilevel converter, a configuration is known in which each controller and the unit converters is connected together over an optical fiber. The controller transmits a command value for the unit converter to the power converter circuit through the optical fiber, and the unit converter transmits, to the controller through the optical fiber, the conditions of elements within the power converter circuit.

One advantage of a fiber optic communication is high speed and high communication quality. However, a problem with a fiber optic communication is that, for a large amount of data transmitted, the number of optical fibers needs to be increased to ensure the high-speed communications to ensure the control performance, which results in an increased cost.

To address such a problem, in the power conversion device disclosed in PTL 1, a controller determines a command value for a unit converter, and transmits it to the unit converter by wireless communications.

CITATION LIST

Patent Literature

PTL 1: Japanese Patent Laying-Open No. 2017-60358

SUMMARY OF INVENTION

Technical Problem

However, since wireless communication is slower than optical communication, a problem with the power conversion device disclosed in PTL 1 is that the unit converters cannot be controlled in a swift manner.

Thus, an object of the present invention is to provide a power conversion device which controls unit converters in a swift manner, without increasing the cost.

Solution to Problem

The present invention is a power conversion device which converts power between a direct-current (DC) circuit and an alternating-current (AC) circuit, the power conversion device including: a power converter circuit which includes a plurality of unit converters connected in series; and a controller. The unit converter includes one or more switching elements and a capacitor. The controller transmits, to the unit converter through a first transmission medium, information on a switching command for the unit converter. The unit converter transmits, to the controller through a second transmission medium, information on at least one condition of the unit converter. The first transmission medium is an optical fiber, and the second transmission medium is a wireless communication channel.

Advantageous Effects of Invention

According to the present invention, the unit converters can be controlled in a swift manner, without increasing the cost.

BRIEF DESCRIPTION OF DRAWINGS

FIG. 3 is a diagram showing examples of outbound information transmitted from controller 3 to unit converter 7.

FIG. 4 is a diagram showing examples of inbound information transmitted from unit converter 7 to controller 3.

FIG. 5 is a block diagram showing configurations of controller 3 and an SM control unit 21.

FIG. 7 is a diagram showing details of the examples of outbound information transmitted from controller 3 to unit converter 7.

FIG. 8 is a diagram showing (A) through (F) illustrating examples of outbound frame.

FIG. 9 is a diagram showing details of the examples of inbound information transmitted from unit converter 7 to controller 3.

FIG. 10 is a diagram showing (A) through (F) illustrating examples of inbound frame.

FIG. 11 is a diagram showing (A) through (E) illustrating examples of inbound frame.

FIG. 12 is a diagram showing (A) through (B) illustrating examples of inbound frame.

DESCRIPTION OF EMBODIMENTS

Hereinafter, embodiments according to the present invention is described, with reference to the accompanying drawings. In the following description, the same reference signs refer to the same components. Their names and functionalities are also the same. Thus, detailed description thereof will not be repeated.

[Configuration of Power Conversion Device]

Figure 1:
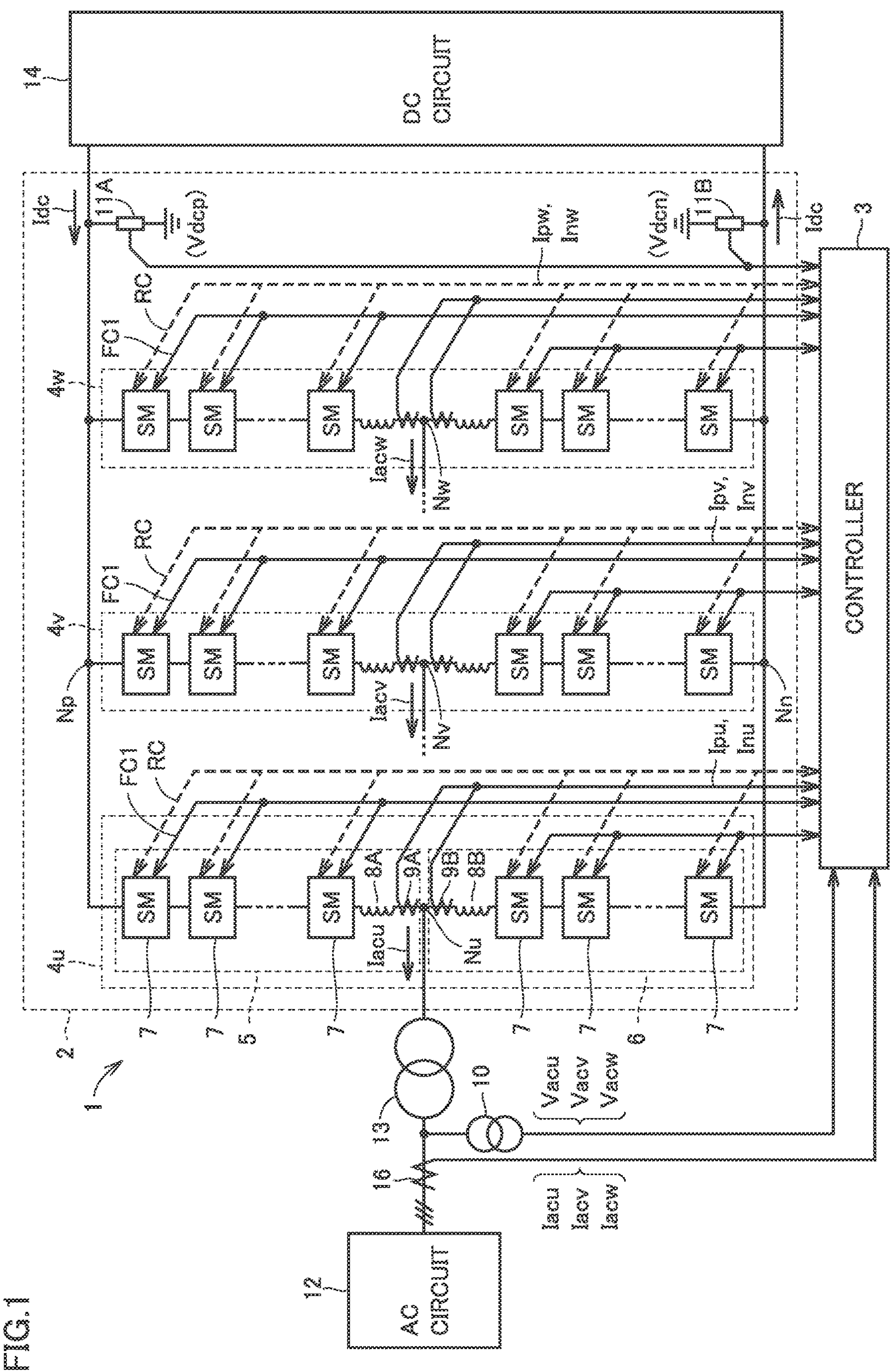
FIG. 1 is a schematic configuration diagram of a power conversion device 1.

FIG. 1 is a schematic configuration diagram of a power conversion device 1. Referring to FIG. 1, power conversion device 1 is configured of a modular multilevel converter which includes multiple unit converters connected in series. Note that the "unit converter" is also called a "sub-module," SM, or a "converter cell." Power conversion device 1 converts power between a direct-current (DC) circuit 14 and an alternating-current (AC) circuit 12. Power conversion device 1 includes a power converter circuit 2 and a controller 3.

Power converter circuit 2 includes multiple leg circuits 4*u*, 4*v*, 4*w* (will be described as a leg circuit 4 when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between an AC circuit 12 and DC circuit 14, and exchanges power between the circuits. AC circuit 12 shown in FIG. 1 is a three-phase AC circuit which includes three leg circuits 4*u*, 4*v*, 4*w* corresponding to a U phase, V phase, and W phase, respectively.

AC input terminals Nu, Nv, Nw provided for respective leg circuits 4*u*, 4*v*, 4*w* are connected to AC circuit 12 via an interconnection transformer 13. AC circuit 12 is, for example, an AC power system which includes an AC power supply, etc. For ease of illustration, FIG. 1 does not show the connection between AC input terminals Nv, Nw and interconnection transformer 13.

High-potential-side DC terminal Np and low-potential-side DC terminal Nn, which are commonly connected to each leg circuit 4, are connected to DC circuit 14. DC circuit 14 is, for example, a DC power system, including a Dc power grid, or a DC terminal of other power conversion device. In the latter case, a BTB (Back To Back) system for connecting different AC power systems having different rated frequencies is formed by coupling two power conversion devices.

AC input terminals Nu, Nv, Nw may be connected to AC circuit 12 via an interconnection reactor, instead of interconnection transformer 13 of FIG. 1. Furthermore, instead of AC input terminals Nu, Nv, Nw, a primary winding may be provided for each of leg circuits 4*u*, 4*v*, 4*w*, and leg circuits 4*u*, 4*v*, 4*w* may be connected to interconnection transformer 13 or an interconnection reactor in an AC manner via a secondary winding magnetically coupled to the primary winding. In this case, the primary winding may be reactors 8A, 8B described below. In other words, leg circuit 4 is electrically (i.e., a DC manner or an AC manner) connected to AC circuit 12 via the connector provided for each of leg circuits 4*u*, 4*v*, 4*w*, such as AC input terminals Nu, Nv, Nw or the above primary winding.

Leg circuit 4*u* includes an upper arm 5 from high-potential-side DC terminal Np to AC input terminal Nu, and a lower arm 6 from low-potential-side DC terminal Nn to AC input terminal Nu. AC input terminal Nu, which is the point of connection between upper arm 5 and lower arm 6, is connected to interconnection transformer 13. High-potential-side DC terminal Np and low-potential-side DC terminal Nn are connected to DC circuit 14. Leg circuits 4*v*, 4*w* have the same configuration as leg circuit 4*u*, and leg circuit 4*u* will thus be representatively described below.

Upper arm 5 includes multiple cascade-connected unit converters 7, and a reactor 8A. Unit converters 7 and reactor 8A are connected in series.

Similarly, lower arm 6 includes multiple cascade-connected unit converters 7, and reactor 8B. Unit converters 7 and reactor 8B are connected in series.

Reactor 8A may be inserted anywhere in upper arm 5 of leg circuit 4*u*. Reactor 8B may be inserted anywhere in lower arm 6 of leg circuit 4*u*. Multiple reactors 8A and multiple reactors 8B may be present. The reactors may have different inductance values. Furthermore, only reactor 8A of upper arm 5 may be provided, or only reactor 8B of lower arm 6 may be provided.

Reactors 8A, 8B are provided to prevent a rapid increase of a fault current in the event of a fault of AC circuit 12 or DC circuit 14, for example. However, reactors 8A, 8B having excessive inductance values result in reduced efficiency of the power converter circuit. Accordingly, preferably, all the switching elements of each unit converter 7 are stopped (turned off) as soon as possible in the event of a fault.

As detectors for measuring the electrical quantities (current, voltage, etc.) for use in the control of power converter 20, power conversion device 1 further includes an AC voltage detector 10, an AC current detector 16, DC voltage detectors 11A, 11B, and arm current detectors 9A, 9B. Arm current detectors 9A, 9B are provided for each leg circuit 4. Signals detected by these detectors are input to controller 3.

Note that, for ease of illustration, in FIG. 1, some of signal lines for the signals input from the detectors to controller 3 and signal lines for the signals input/output to/from controller 3 and each unit converter 7 are depicted collectively, but they are, in practice, provided for each detector and each unit converter 7. The signal lines may be provided separately for transmission and receipt of the signals between each unit converter 7 and controller 3. In the present embodiment, a first transmission medium and a second transmission medium between controller 3 and each unit converter 7 are an optical fiber FC1 and a wireless communication channel RC, respectively.

In the following, each detector is described in detail.

AC voltage detector 10 detects a U-phase AC voltage value Vacu, a V-phase AC voltage value Vacv, and a W-phase AC voltage value Vacw of AC circuit 12. AC current detector 16 detects a U-phase AC current value Iacu, a V-phase AC current value lacy, and a W-phase AC current value Iacw of AC circuit 12. DC voltage detector 11A detects a DC voltage value Vdcp of high-potential-side DC terminal Np connected to DC circuit 14. DC voltage detector 11B detects a DC voltage value Vdcn of low-potential-side DC terminal Nn connected to DC circuit 14.

Arm current detectors 9A and 9B, included in leg circuit 4*u* for U phase, respectively detect an upper arm current Ipu flowing through the upper arm 5 and a lower arm current Inu flowing through the lower arm 6. Similarly, arm current detectors 9A and 9B, included in leg circuit 4*v* for V phase, detect an upper arm current Ipv and a lower arm current Inv, respectively. Arm current detectors 9A and 9B, included in leg circuit 4*w* for W phase, detect an upper arm current Ipw and a lower arm current Inw, respectively.

[Configuration Example of Unit Converter]

Figure 2:
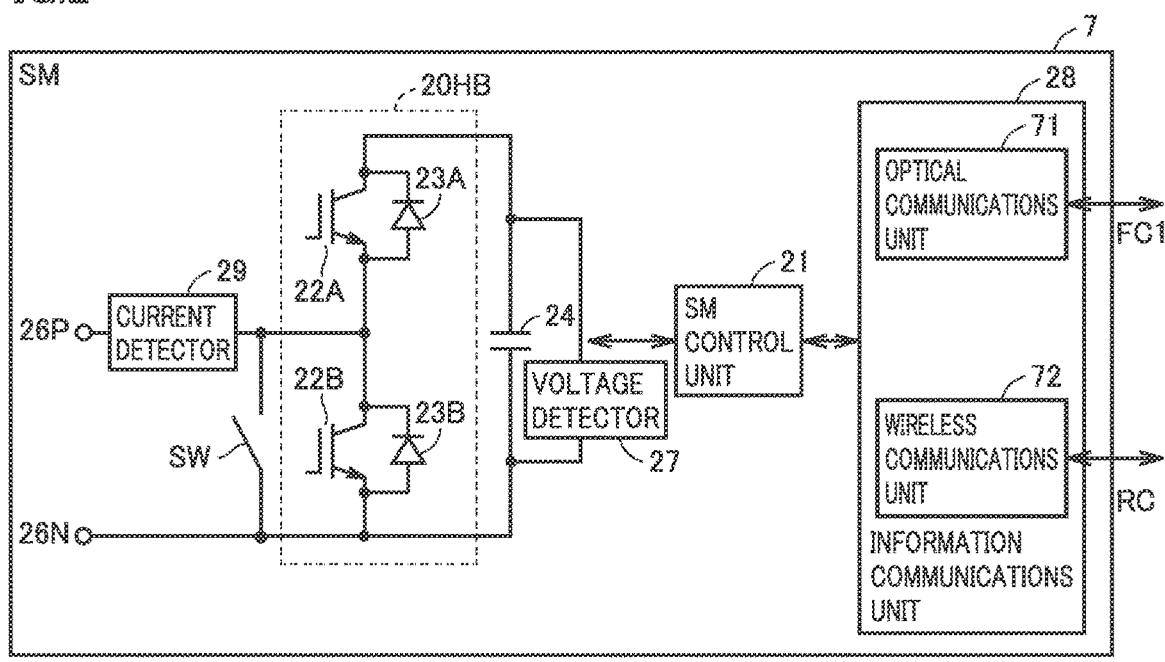
FIG. 2 is a circuit diagram showing one example unit converter included in each leg circuit of FIG. 1.

FIG. 2 is a circuit diagram showing one example of the unit converter included in each leg circuit of FIG. 1. As shown in FIG. 2, unit converter 7 includes a half-bridge converter circuit 20HB, an SM control unit 21, a voltage detector 27, a current detector 29, a capacitor 24 as an energy storage, a bypass switch SW, and an information communications unit 28.

Half-bridge converter circuit 20HB includes switching elements 22A, 22B connected in series, and diodes 23A, 23B. Diodes 23A, 23B are connected in anti-parallel (i.e., in parallel and in the reverse bias direction) with switching elements 22A, 22B, respectively. Capacitor 24 is connected in parallel with a series connected circuit of switching elements 22A, 22B, and holds a DC voltage. A connection node between switching elements 22A, 22B is connected to a high-potential-side input-output terminal 26P. A connection node between switching element 22B and capacitor 24 is connected to a low-potential-side input-output terminal 26N.

A self-turn-off switching element that is capable of controlling the on operation and off operation thereof is used for each of switching elements 22A, 22B. Switching elements 22A, 22B are, for example, IGBTs (Insulated Gate Bipolar Transistor) or GCTs (Gate Commutated Turn-off thyristor).

Bypass switch SW is connected between input-output terminals 26P, 26N. A short circuit is formed across the switching element 22B by closing the contact of bypass switch SW. Bypass switch SW can allow a fault current to pass therethrough. In other words, by bypass switch SW short-circuiting the unit converter 7, each element (switching elements 22A, 22B, diodes 23A, 23B, and capacitor 24) included in unit converter 7 is protected from overcurrent that is caused in the event of a fault.

Bypass switch SW is also used to short-circuit the unit converter 7 in the event of a failure of any element included in unit converter 7. With this, in the event of a failure of any unit converter 7 among unit converters 7, power conversion device 1 is allowed to continue the operation by using the other unit converters 7.

SM control unit 21 controls switching of switching elements 22A, 22B. In normal operation (i.e., when SM control unit 21 outputs a zero voltage or a positive voltage between input-output terminals 26P, 26N), SM control unit 21 controls switching elements 22A, 22B so that one of switching elements 22A, 22B is on and the other one of switching elements 22A, 22B is off. When switching element 22A is on and switching element 22B is off, a voltage across the capacitor 24 is applied between input-output terminals 26P, 26N. Conversely, when switching element 22A is off and switching element 22B is on, the voltage between input-output terminals 26P, 26N is 0V.

Unit converter 7 is capable of turning on switching elements 22A, 22B alternately, thereby outputting a zero voltage or a positive voltage that is dependent on the voltage of capacitor 24. Diodes 23A, 23B are provided for protection of switching elements 22A, 22B upon application of a reverse voltage to switching elements 22A, 22B.

Voltage detector 27 detects a voltage (hereinafter, capacitor voltage) Vcap across the capacitor 24. Current detector 29 detects a current (hereinafter, passing current) Ipa flowing through the input-output terminal 26P of unit converter 7.

Information communications unit 28 includes an optical communications unit 71 and a wireless communications unit 72. Optical communications unit 71 communicates with controller 3 through optical fiber FC1. Wireless communications unit 72 communicates with controller 3 through wireless communication channel RC.

[Transmitted Information]

Next, information transmitted between controller 3 and unit converter 7 is described.

FIG. 3 is a diagram showing examples of outbound information transmitted from controller 3 to unit converter 7.

Controller 3 transmits to unit converter 7 through optical fiber FC1 "information on a switching command for a unit converter." In order to control unit converter 7 at high speed and accurately, the switching command is transmitted through a highly reliable optical communication by optical fiber FC1.

Controller 3 transmits to unit converter 7 through optical fiber FC1 and wireless communication channel RC "information on communications abnormality or abnormality in controller." The information on communications abnormality or abnormality in controller is transmitted by optical fiber FC1 and wireless communication channel RC, so as to be assuredly transmitted even when an abnormality is found in any one of the paths.

Controller 3 transmits to unit converter 7 through wireless communication channel RC "information on a test command for unit converter 7." Since there is relatively less need for the test command to be transmitted at high speed and with high reliability, the test command is transmitted in a wireless manner.

FIG. 4 is a diagram showing examples of inbound information transmitted from unit converter 7 to controller 3.

Unit converter 7 transmits to controller 3 through wireless communication channel RC at least some of the information on the condition of unit converter 7. Since not all the information is transmitted through optical fiber FC1, the transmission capacity over optical fiber FC1 can be reduced.

Unit converter 7 transmits to controller 3 through optical fiber FC1 and wireless communication channel RC "information on the condition of unit converter 7 which changes on a switching command." The condition of unit converter 7 which changes on a switching command is transmitted by optical fiber FC1 and wireless communication channel RC so as to be assuredly transmitted even when an abnormality is found in any one of the paths.

Unit converter 7 transmits to controller 3 through optical fiber FC1 and wireless communication channel RC "information on communication timeout and severe abnormality in unit converter 7." The information on the communication timeout and severe abnormality in unit converter 7 are transmitted by optical fiber FC1 and wireless communication channel RC so as to be assuredly transmitted even when an abnormality is found in any one of the paths.

Unit converter 7 transmits to controller 3 through optical fiber FC1 "information on instantaneous abnormality in communications by the optical fiber FC1." Since instantaneous abnormality does not occur at wireless communication channel RC that has a long communication period, the instantaneous abnormality is limited to the communications by optical fiber FC1. Since the abnormality is caused on the path by optical fiber FC1, which requires no communication by wireless communication channel RC, the information on instantaneous abnormality in communications by the optical fiber FC1, is transmitted by optical fiber FC1.

Unit converter 7 transmits to controller 3 through wireless communication channel RC "information on slight abnormality in unit converter 7." Since there is less need for the slight abnormality in unit converter 7 to be transmitted at high speed, the information on slight abnormality in unit converter 7 is transmitted by wireless communication channel RC, which is slow.

Unit converter 7 transmits to controller 3 through wireless communication channel RC "information on the condition of unit converter 7 irrelevant to a switching command." Since there is less need for the condition of unit converter 7 irrelevant to a switching command, to be transmitted at high speed, the information on information on the condition of unit converter 7 irrelevant to a switching command is transmitted by wireless communication channel RC, which is slow.

[Configuration of Controller]

FIG. 5 is a block diagram showing configurations of controller 3 and SM control unit 21.

Referring to FIG. 5, controller 3 includes a supervisory controller 38, a converter controller 35, and a relay device 70.

Relay device 70 relays the communications between converter controller 35 and multiple unit converters 7. Supervisory controller 38 and converter controller 35 are connected to each other by a wired electrical communication channel EC, such as LAN (Local Area Network). Converter controller 35 and relay device 70 are connected to each other by an optical fiber FC2. Converter controller 35 includes a command generator 37. Relay device 70 and unit converter 7 are connected by optical fiber FC1.

Supervisory controller 38 and unit converter 7 are connected to each other by wireless communication channel RC.

[Configuration Example of Command Generator 37]

Figure 6:
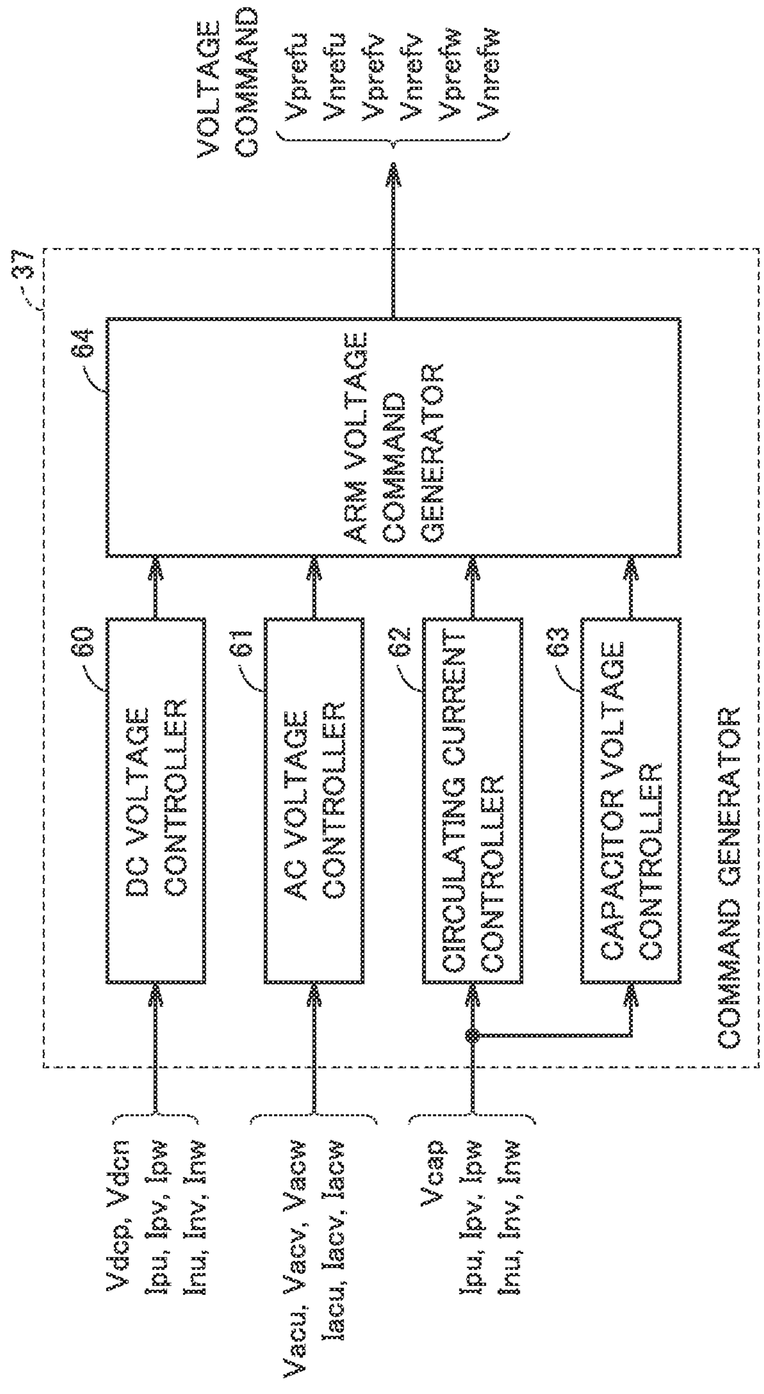
FIG. 6 is a block diagram showing a configuration example of a command generator 37 included in a converter controller 35.

FIG. 6 is a block diagram showing a configuration example of command generator 37 included in converter controller 35. Referring to FIG. 6, command generator 37 includes a DC voltage controller 60, an AC voltage controller 61, a circulating current controller 62, a capacitor voltage controller 63, and an arm voltage controller 64.

DC voltage controller 60 calculates a DC current value Idc, based on upper arm currents Ipu, Ipv, Ipw and lower arm currents Inu, Inv, Inw of the respective phases. Specifically, DC current value Idc is calculated by Equation (1):

$$Idc=(Idc\_p+Idc\_n)/2 \quad (1)$$

where Idc_p is the sum of upper arm currents Ipu, Ipv, Ipw, and Idc_n is the sum of lower arm currents Inu, Inv, Inw.

DC voltage controller 60 generates a DC voltage command value, based on DC voltage values Vdcp, Vdcn detected by DC voltage detectors 11A, 11B, and the calculated DC current value Idc. DC voltage controller 60 is configured of, for example, a feedback controller, such as a proportional-integral-differential controller (PID controller).

AC voltage controller 61 generates an AC voltage command value of each phase, based on U-phase, V-phase, W-phase AC voltage values Vacu, Vacv, Vacw detected by AC voltage detector 10, and U-phase, V-phase, W-phase AC current values Iacu, lacy, Iacw detected by AC current detector 16. AC voltage controller 61 is configured of, for example, a feedback controller, such as a PID controller.

Initially, circulating current controller 62 calculates circulating currents Iccu, Iccv, Iccw respectively flowing through leg circuits 4*u*, 4*v*, 4*w*, based on upper arm currents Ipu, Ipv, Ipw and lower arm currents Inu, Inv, Inw of the respective phases. The circulating current circulates through multiple leg circuits 4. For example, a circulating current Iccu flowing through U-phase leg circuit 4*u* is calculated by Equation (2):

$$Iccu=(Ipu+Inu)/2-Idc/3 \quad (2)$$

where the first term of Equation (2) indicates a current commonly flowing through upper arm 5 and lower arm 6 of leg circuit 4*u*. The second term of Equation (2) indicates the share of U-phase leg circuit 4*u*, assuming that DC current value Idc flows evenly through each leg circuit. Circulating currents Iccv, Iccw are calculated in the same manner.

Circulating current controller 62 calculates a command value for the circulating current of each phase, based on the calculated circulating currents Iccu, Iccv, Iccw of the respective phases and a capacitor voltage Vcap that is averaged for each arm circuit. Circulating current controller 62 is configured of, for example, a feedback controller, such as a PID controller.

Capacitor voltage controller 63 generates a voltage command value for capacitor 24 of each unit converter 7, based on capacitor voltage Vcap averaged for each arm circuit, and upper arm currents Ipu, Ipv, Ipw and lower arm currents Inu, Inv, Inw of the respective phases. Capacitor voltage controller 63 is configured of, for example, a feedback controller, such as a PID controller.

Arm voltage controller 64 combines the above controllers, thereby generating arm voltage command values Vprefu, Vnrefu, Vprefv, Vnrefv, Vprefw, Vnrefw (hereinafter, voltage commands) for upper arm 5 and lower arm 6 of the respective phase. The voltage commands are transmitted to unit converters 7 via relay device 70.

Note that the configuration of command generator 37 described above is by way of example, and a controller of other configuration is applicable to the present embodiment.

(Configuration of SM Control Unit)

Referring, again, to FIG. 5, SM control unit 21 is now described.

SM control unit 21 includes a switching controller 121, a condition management unit 122, a bypass controller 124, and a test controller 123.

SM control unit 21 includes a phase generator 104, a phase adjuster 106, a PWM (Pulse Width Modulation) signal generator 108, and a gate driver 110.

FIG. 7 is a diagram showing details of the examples of outbound information transmitted from controller 3 to unit converter 7. Parts (A) through (F) of FIG. 8 are diagrams illustrating examples of outbound frame. Parts (A) through (D) of FIG. 8 show wired frames, and (E) through (F) of FIG. 8 show wireless frames.

A wired frame includes a header, a payload, and a frame check sequence (FCS). The header includes a flag, a normal command, a sequence number, and a data length. A wireless frame includes a header and a payload. The header includes a PHY header, a MAC header, an ID header, and a TCP/UDP header. The destination of the wireless frame is identifiable by the header. The destination of the wired frame is identifiable by an identification signal described below. If the wired frame contains no identification signal, all the unit converters that have received the wired frame are the destinations of the wired frame.

During operation of power converter circuit 2, converter controller 35 transmits to unit converter 7 through optical fiber FC2, relay device 70, and optical fiber FC1 "information on a first switching command for a unit converter." As shown in (A) of FIG. 8, the "information on a first switching command for a unit converter" is transmitted in the payload of a wired frame FD1.

The "information on a first switching command for a unit converter" includes at least one of a voltage command, a carrier signal, a PWM signal, and a synchronization signal.

Optical communications unit 71, included in unit converter 7, receives wired frame FD1. If wired frame FD1 contains a voltage command, optical communications unit 71 outputs the voltage command to PWM signal generator 108. If wired frame FD1 contains a carrier signal, optical communications unit 71 outputs the carrier signal to phase adjuster 106. If wired frame FD1 contains a PWM signal, optical communications unit 71 outputs the PWM signal to gate driver 110. If wired frame FD1 contains a synchronization signal, optical communications unit 71 outputs the synchronization signal to phase adjuster 106.

Phase adjuster 106 adjusts the phase of the carrier signal, based on a carrier phase T(M) generated by phase generator 104 and a synchronization signal (i.e., a synchronized pulse signal corresponding to the reference phase). When the carrier signal is a triangular signal, the carrier signal whose phase has been adjusted is a triangular-wave signal that is shifted from the synchronized pulse signal (i.e., the reference phase) by carrier phase T(M).

PWM signal generator 108 compares the voltage command and the carrier signal adjusted by phase adjuster 106, and thereby generates a PWM signal having a pulse waveform. PWM signal generator 108 outputs the generated PWM signal to gate driver 110.

Gate driver 110 outputs to conduction control terminals (e.g., gate terminals) of switching elements 22A, 22B a drive voltage which is based on the PWM signal generated by PWM signal generator 108 or the PWM signal transmitted from optical communications unit 71.

At the initial settings of power converter circuit 2, converter controller 35 transmits to unit converter 7 through optical fiber FC2, relay device 70, and optical fiber FC1 "information on a second switching command for a unit converter." As shown in (B) of FIG. 8, the "information on a second switching command for a unit converter" is transmitted in the payload of wired frame FD2.

The "information on a second switching command for a unit converter" includes at least one of: an identification signal for unit converter 7; a common phase offset OS; and the number of unit converters to be controlled (hereinafter, unit converter count Sn), among the unit converters.

Optical communications unit 71, included in unit converter 7, receives a wired frame FD2. If wired frame FD2 contains any of an identification signal for unit converter 7, common phase offset OS, and unit converter count Sn, optical communications unit 71 outputs them to phase generator 104.

Phase generator 104 generates a carrier phase, based on unit converter count Sn, common phase offset OS, and the identification signal of the unit converter transmitted from optical communications unit 71 or a predetermined identification signal of the unit converter.

Specifically, using unit converter count Sn, phase generator 104 calculates a carrier spacing D (=360 degrees/(carrier signal scaling factor×unit converter count Sn)). Given that the number M of unit converter 7, represented by the identification signal of the unit converter, is 0 to Sn−1. Here, the carrier signal scaling factor indicates a scaling factor of the carrier signal frequency over the AC system frequency, and is 1.0 or greater. Based on common phase offset OS, the identification signal of the unit converter, and carrier spacing D, phase generator 104 generates carrier phase T(M). For example, using carrier spacing D and common phase offset OS, carrier phase T(M) is represented by the following equation, and is determined uniquely for each unit converter 7.

$$T(M)=(M-1)\times\text{carrier spacing } D+\text{ common phase offset } OS \quad (3)$$

Supervisory controller 38 transmits to unit converter 7 through wired electrical communication channel EC, converter controller 35, optical fiber FC2, relay device 70, and optical fiber FC1 "information on a third switching command for a unit converter." As shown in (C) of FIG. 8, the "information on a third switching command for a unit converter" is transmitted in the payload of a wired frame FD3.

The "information on a third switching command for a unit converter" includes at least one of a gate block command and a gate deblock command.

Optical communications unit 71, included in unit converter 7, receives wired frame FD3. If wired frame FD3 contains a gate block command or gate deblock command, optical communications unit 71 outputs the gate block command or gate deblock command to gate driver 110. Based on the gate block command, gate driver 110 stops outputting a drive voltage based on a PWM signal. Based on the gate deblock command, gate driver 110 resumes outputting the drive voltage based on the PWM signal.

Supervisory controller 38 transmits to unit converter 7 through wired electrical communication channel EC, converter controller 35, optical fiber FC2, relay device 70, and optical fiber FC1 "information on communications abnormality or abnormality in controller." As shown in (D) of FIG. 8, "information on communications abnormality or abnormality in controller" is transmitted in the payload of a wired frame FD4.

Supervisory controller 38 transmits to unit converter 7 through wireless communication channel RC "information on communications abnormality or abnormality in controller." As shown in (E) of FIG. 8, the "information on communications abnormality or abnormality in controller" is transmitted in the payload of a wireless frame FD5.

The "information on communications abnormality or abnormality in controller" includes at least one of: information indicative of the presence or absence of abnormality in supervisory controller 38; information indicative of the presence or absence of abnormality in converter controller 35; information indicative of the presence or absence of a cyclic redundancy check (CRC) error; information indicative of the presence or absence of non-detection of light quantity of the optical fiber; and information indicative of the presence or absence of a communication timeout. The CRC error is one in the wireless communication or in the fiber optic communication. A communication timeout is one in the wireless communication or in the fiber optic communication.

Optical communications unit 71, included in unit converter 7, receives wired frame FD4. If wired frame FD4 contains the information indicative of the presence or absence of abnormality in supervisory controller 38, optical communications unit 71 outputs the information indicative of the presence or absence of abnormality in supervisory controller 38 to condition management unit 122. If wired frame FD4 contains the information indicative of the presence or absence of abnormality in converter controller 35, optical communications unit 71 outputs the information indicative of the presence or absence of abnormality in converter controller 35 to condition management unit 122. If wired frame FD4 contains the information indicative of the presence or absence of a CRC error, optical communications unit 71 outputs the information indicative of the presence or absence of a CRC error to condition management unit 122. If wired frame FD4 contains the information indicative of the presence or absence of non-detection of light quantity of the optical fiber, optical communications unit 71 outputs to condition management unit 122 the information indicative of the presence or absence of non-detection of light quantity of the optical fiber. If wired frame FD4 contains the information indicative of the presence or absence of a communication timeout, optical communications unit 71 outputs the information indicative of the presence or absence of the communication timeout to condition management unit 122.

Wireless communications unit 72, included in unit converter 7, receives wireless frame FD5. If wired frame FD5 contains the information indicative of the presence or absence of abnormality in supervisory controller 38, wireless communications unit 72 outputs the information indicative of the presence or absence of abnormality in supervisory controller 38 to condition management unit 122. If wired frame FD5 contains the information indicative of the presence or absence of abnormality in converter controller 35, wireless communications unit 72 outputs the information indicative of the presence or absence of abnormality in converter controller 35 to condition management unit 122. If wired frame FD5 contains the information indicative of the presence or absence of a CRC error, wireless communications unit 72 outputs the information indicative of the presence or absence of a CRC error to condition management unit 122. If wired frame FD5 contains the information indicative of the presence or absence of non-detection of light quantity of the optical fiber, wireless communications unit 72 outputs the information indicative of the presence or absence of non-detection of light quantity of the optical fiber to condition management unit 122. If wired frame FD5 contains the information indicative of the presence or absence of a communication timeout, wireless communications unit 72 outputs the information indicative of the presence or absence of the communication timeout to condition management unit 122.

As such, since the "information on communications abnormality or abnormality in controller" is transmitted by two communication paths, the "information on communications abnormality or abnormality in controller" is transmitted to unit converter 7 even when abnormality is found in any one of the paths.

Upon receipt of the "information on communications abnormality or abnormality in controller," condition management unit 122 instructs bypass controller 124 to close bypass switch SW. The transmission of the "information on communications abnormality or abnormality in controller" also causes supervisory controller 38, converter controller 35, and relay device 70 to stop processing.

Supervisory controller 38 transmits to unit converter 7 through wired electrical communication channel EC, converter controller 35, optical fiber FC2, relay device 70, and optical fiber FC1 "information on a test command for a unit converter." As shown in (F) of FIG. 8, the "information on a test command for a unit converter" is transmitted in the payload of a wireless frame FD6.

The "information on a test command for a unit converter" includes at least one of: a start testing command, and ON/OFF command for each switching element; a gate block command; a gate deblock command; a bypassing command; and a simulating command for each communication data.

Wireless communications unit 72, included in unit converter 7, receives wireless frame FD6. If wireless frame FD6 contains a start testing command, wireless communications unit 72 outputs the start testing command to test controller 123. Based on the start testing command, test controller 123 controls the start of the test. If wireless frame FD6 contains an ON/OFF command for each switching element, wireless communications unit 72 outputs the ON/OFF command for each switching element to test controller 123. Based on the ON/OFF command for each switching element, test controller 123 controls ON/OFF of each switching element during testing. If wireless frame FD6 contains a gate block command, wireless communications unit 72 outputs the gate block command to test controller 123. Based on the gate block command, test controller 123 controls gate blocking during testing. If wireless frame FD6 contains a gate deblock command, wireless communications unit 72 outputs the gate deblock command to test controller 123. Based on the gate deblock command, test controller 123 controls gate deblocking during testing. If wireless frame FD6 contains a bypassing command, wireless communications unit 72 outputs the bypassing command to test controller 123. Based on the bypassing command, test controller 123 controls opening and closing of bypass switch SW during testing. If wireless frame FD6 contains a simulating command for each communication data, wireless communications unit 72 outputs the simulating command for each communication data to test controller 123. Based on the simulating command for each communication data, test controller 123 controls simulated operation of unit converter 7 during testing.

FIG. 9 is a diagram showing details of the examples of inbound information transmitted from unit converter 7 to controller 3. Parts (A) through (F) of FIG. 10, (A) through (E) of FIG. 11, and (A) through (B) of FIG. 12 are diagrams illustrating examples of inbound frame.

Parts (A), (C), and (E) of FIG. 10 and (A) through (E) of FIG. 11 illustrate wired frames, and (B), (D), and (F) of FIG. 10 and (A) through (B) of FIG. 12 illustrate wireless frames.

A wired frame includes a header, a payload, and a FCS. The header includes a flag, a normal command, a sequence number, and a data length. A wireless frame includes a header and a payload. The header includes a PHY header, a MAC header, an ID header, and a TCP/UDP header.

Condition management unit 122, included in unit converter 7, manages capacitor voltage Vcap detected by voltage detector 27, passing current Ipa detected by current detector 29, and the operational state of unit converter 7.

Unit converter 7 transmits to relay device 70 through optical fiber FC1 "information indicative of a first condition of a unit converter which changes on a switching command." As shown in (A) of FIG. 10, the "information indicative of a first condition of a unit converter which changes on a switching command" is transmitted in the payload of a wired frame FU1.

Unit converter 7 transmits to unit converter 7 through wireless communication channel RC "information indicative of a first condition of a unit converter which changes on a switching command." As shown in (B) of FIG. 10, the "information indicative of a first condition of a unit converter which changes on a switching command" is transmitted in the payload of a wireless frame FU2.

The "information indicative of a first condition of a unit converter which changes on a switching command" includes at least one of information indicative of capacitor voltage Vcap and information indicative of passing current Ipa.

Upon receipt of the "information indicative of a first condition of a unit converter which changes on a switching command" through wireless communication channel RC, supervisory controller 38 controls unit converter 7, in accordance with the "information indicative of a first condition of a unit converter which changes on a switching command."

Condition management unit 122, included in unit converter 7, manages the gate-blocked state of unit converter 7, the gate-deblocked state of unit converter 7, and the operational state of unit converter 7. The operational state refers to a state of unit converter 7 as being operable in accordance with a command value from controller 3.

Unit converter 7 transmits to relay device 70 through optical fiber FC1 "information indicative of a second condition of a unit converter which changes on a switching command." As shown in (C) of FIG. 10, the "information indicative of a second condition of a unit converter which changes on a switching command" is transmitted in the payload of a wired frame FU3.

Unit converter 7 transmits to unit converter 7 through wireless communication channel RC the "information indicative of a second condition of a unit converter which changes on a switching command." As shown in (D) of FIG. 10, the "information indicative of a second condition of a unit converter which changes on a switching command" is transmitted in the payload of a wireless frame FU4.

The "information indicative of a second condition of a unit converter which changes on a switching command" includes at least one of information indicative of the gate-blocked state of unit converter 7, information indicative of the gate-deblocked state of unit converter 7, and information indicative of the operational state of unit converter 7.

Upon receipt of the "information indicative of a second condition of a unit converter which changes on a switching command" through wireless communication channel RC, supervisory controller 38 controls unit converter 7, in accordance with the "information indicative of a second condition of a unit converter which changes on a switching command."

Condition management unit 122, included in unit converter 7, manages the presence or absence of a communication timeout, the information indicative of the presence or absence of abnormality in power supply for unit converter 7, abnormality in clock of unit converter 7, and severe abnormality in capacitor voltage of unit converter 7. The communication timeout refers to a communication timeout in wireless communication or fiber optic communication. The severe abnormality in capacitor voltage indicates that capacitor voltage Vcap is higher than a standard level by at least AV1.

Unit converter 7 transmits to relay device 70 through optical fiber FC1 "information on communication timeout or severe abnormality in unit converter." As shown in (E) of FIG. 10, the "information on communication timeout or severe abnormality in unit converter" is transmitted in the payload of the wired frame FU5.

Unit converter 7 transmits to unit converter 7 through wireless communication channel RC the "information on communication timeout or severe abnormality in unit converter." As shown in (F) of FIG. 10, the "information on communication timeout or severe abnormality in unit converter" is transmitted in the payload of a wireless frame FU6.

The "information on communication timeout or severe abnormality in unit converter" includes at least one of: information indicative of the presence or absence of a communication timeout; information indicative of the presence or absence of abnormality in power supply for unit converter 7; information indicative of the presence or absence of abnormality in clock of unit converter 7; and information indicative of the presence or absence of severe abnormality in capacitor voltage of unit converter 7.

After the transmission of the "information on communication timeout or severe abnormality in unit converter," bypass controller 124, included in unit converter 7, closes bypass switch SW.

Upon receipt of the "information on communication timeout or severe abnormality in unit converter" through wireless communication channel RC, supervisory controller 38 controls the other unit converters 7, in accordance with the "information indicative of a second condition of a unit converter which changes on a switching command."

Having received the "information indicative of a first condition of a unit converter which changes on a switching command," relay device 70 transmits to supervisory controller 38 through optical fiber FC2, converter controller 35, and wired electrical communication channel EC "aggregated information of aggregation of the first conditions of unit converters which change on a switching command". As shown in (A) of FIG. 11, the "aggregated information of the first conditions of unit converters which change on a switching command" is transmitted in the payload of a wired frame FU7.

The "aggregated information of the first conditions of unit converters which change on a switching command" includes at least one of: information indicative of the sum or average of capacitor voltages of unit converters 7; and information indicative of the sum or average of passing currents of unit converters 7. Since the aggregated information of the first conditions is transmitted from relay device 70 to supervisory controller 38, the amount of information transmitted can be reduced.

Upon receipt of the "aggregated information of the first conditions of unit converters which change on a switching command," supervisory controller 38 controls multiple unit converters 7, based on the "aggregated information of the first conditions of unit converters which change on a switching command."

Having received the "information indicative of a second condition of a unit converter which changes on a switching command," relay device 70 transmits to supervisory controller 38 through optical fiber FC2, converter controller 35, and wired electrical communication channel EC, "aggregated information of the second conditions of unit converters which change on a switching command." As shown in (B) of FIG. 11, the "aggregated information of the second conditions of unit converters which change on a switching command" is transmitted in the payload of a wired frame FU8.

The "aggregated information of the second conditions of unit converters which change on a switching command" includes at least one of: information indicative of a logical AND of the gate-blocked states of unit converters 7; information indicative of a logical AND of the gate-deblocked states of unit converters 7; and information indicative of a logical AND of the operational states of unit converters 7. Since aggregated information of the second conditions of multiple unit converters 7 is transmitted from relay device 70 to supervisory controller 38, the amount of information transmitted can be reduced.

Upon receipt of the "aggregated information of the second conditions of unit converters which change on a switching command," supervisory controller 38 controls unit converters 7, based on the "aggregated information of the second conditions of unit converters which change on a switching command."

Having received the "information indicative of a communication timeout or severe abnormality in unit converter," relay device 70 transmits to supervisory controller 38 through optical fiber FC2, converter controller 35, and wired electrical communication channel EC "aggregated information of communication timeouts or severe abnormalities in unit converters." As shown in (C) of FIG. 11, the "aggregated information of communication timeouts or severe abnormalities in unit converters" is transmitted in the payload of a wired frame FU9.

The "aggregated information of communication timeouts or severe abnormalities of unit converters" includes at least one of: information indicative of a logical OR of the presence or absence of the communication timeouts of unit converters 7; information indicative of a logical OR of the presence or absence of abnormalities in power supplies for unit converters 7; information indicative of a logical OR of the presence or absence of abnormalities in clocks included in unit converters 7; and information indicative of a logical OR of the presence or absence of severe abnormalities in capacitor voltages of unit converters 7. Since the aggregated information of communication timeouts or severe abnormalities in unit converters is transmitted from relay device 70 to supervisory controller 38, the amount of information transmitted can be reduced.

Upon receipt of the "aggregated information of communication timeouts or severe abnormalities in unit converters," supervisory controller 38 controls unit converters 7, based on the "aggregated information of communication timeouts or severe abnormalities in unit converters."

Condition management unit 122, included in unit converter 7, manages the information indicative of the presence or absence of CRC (Cyclic Redundancy Check) error in fiber optic communication, the information indicative of the presence or absence of non-detection of light quantity of the optical fiber, and the presence or absence of an FCS error in fiber optic communication.

Unit converter 7 transmits to relay device 70 through optical fiber FC1 "information indicative of instantaneous abnormality in fiber optic communication." As shown in (D) of FIG. 11, the "information indicative of instantaneous abnormality in fiber optic communication" is transmitted in the payload of a frame FU10.

The "information indicative of instantaneous abnormality in fiber optic communication" includes at least one of: the information indicative of the presence or absence of an CRC error; the information indicative of the presence or absence of non-detection of light quantity of the optical fiber; and the information indicative of the presence or absence of an FCS error.

After the transmission of the "information indicative of instantaneous abnormality in fiber optic communication," bypass controller 124, included in unit converter 7, closes bypass switch SW.

Having received the "information indicative of instantaneous abnormality in fiber optic communication," relay device 70 transmits to supervisory controller 38 through optical fiber FC2, converter controller 35, and wired electrical communication channel EC "aggregated information of instantaneous abnormalities in fiber optic communications." As shown in (E) of FIG. 11, the "aggregated information of instantaneous abnormalities in fiber optic communications" is transmitted in the payload of a wired frame FU11.

The "aggregated information of instantaneous abnormalities in fiber optic communications" includes at least one of: information indicative of a logical OR of the presence or absence of CRC errors in unit converters 7, information indicative of a logical OR of the presence or absence of non-detections of light quantities of the optical fibers of unit converters 7, information indicative of a logical OR of the presence or absence of FCS errors in unit converters 7. Since the aggregated information of instantaneous abnormalities in fiber optic communications is transmitted from relay device 70 to supervisory controller 38, the amount of information transmitted can be reduced.

Upon receipt of the "aggregated information of instantaneous abnormalities in fiber optic communications," supervisory controller 38 controls unit converters 7, based on the "aggregated information of instantaneous abnormalities in fiber optic communications."

Condition management unit 122, included in unit converter 7, manages the presence or absence of a slight excess of capacitor voltage Vcap of unit converter 7; the presence or absence of a slight deficit in capacitor voltage Vcap of unit converter 7; and the presence or absence of abnormality in recording functionality of unit converter 7. A slight excess of capacitor voltage Vcap of unit converter 7 indicates that capacitor voltage Vcap is higher than the standard level by AV2 or greater and AV1 or less. A slight deficit in capacitor voltage Vcap indicates that capacitor voltage Vcap is lower than the standard level by AV2 or greater and AV1 or less. Abnormality in recording functionality of unit converter 7 is abnormality in functionality of recording various signals before and after occurrence of abnormality in unit converter 7, and data indicative of abnormality in unit converter 7.

Unit converter 7 transmits to unit converter 7 through wireless communication channel RC "information on slight abnormality in unit converter." As shown in (A) of FIG. 12, the "information on slight abnormality in unit converter" is transmitted in the payload of a wireless frame FU12.

The "information on slight abnormality in unit converter" includes at least one of: information indicative of the presence or absence of a slight excess of capacitor voltage Vcap of unit converter 7; information indicative of the presence or absence of a slight deficit in capacitor voltage Vcap of unit converter 7; and the information indicative of the presence or absence of abnormality in recording functionality of unit converter 7.

After the transmission of the "information on slight abnormality in unit converter," bypass controller 124, included in unit converter 7, does not close bypass switch SW.

Upon receipt of the "information on slight abnormality in unit converter," supervisory controller 38 controls unit converter 7, based on the "information on slight abnormality in unit converter."

Condition management unit 122, included in unit converter 7, manages the conditions of switching elements 22A, 22B, the condition of bypass switch SW, answerback to a switching command, and the recorded data of the unit converter. The answerback to the switching command refers to, for example, notification of completion of the process in response to a switching command, or notification that the process, in response to a switching command, is in progress. The recorded data of unit converter 7 are various signals before and after the occurrence of abnormality in unit converter 7, data indicative of abnormality in unit converter 7, etc.

Unit converter 7 transmits to unit converter 7 through wireless communication channel RC "information on the condition of a unit converter irrelevant to a switching command." As shown in (B) of FIG. 12, the "information on the condition of a unit converter irrelevant to a switching command" is transmitted in the payload of a wireless frame FU13.

The "information on the condition of a unit converter irrelevant to a switching command" includes at least one of: information indicative of the conditions of switching elements 22A, 22B; information indicative of the condition of bypass switch SW; information indicative of answerback to a switching command; and the recorded data of the unit converter.

Upon receipt of the "information on the condition of a unit converter irrelevant to a switching command," supervisory controller 38 controls unit converter 7, based on the "information on the condition of the unit converter irrelevant to a switching command."

(Hardware Configuration of Controller)

Figure 13:
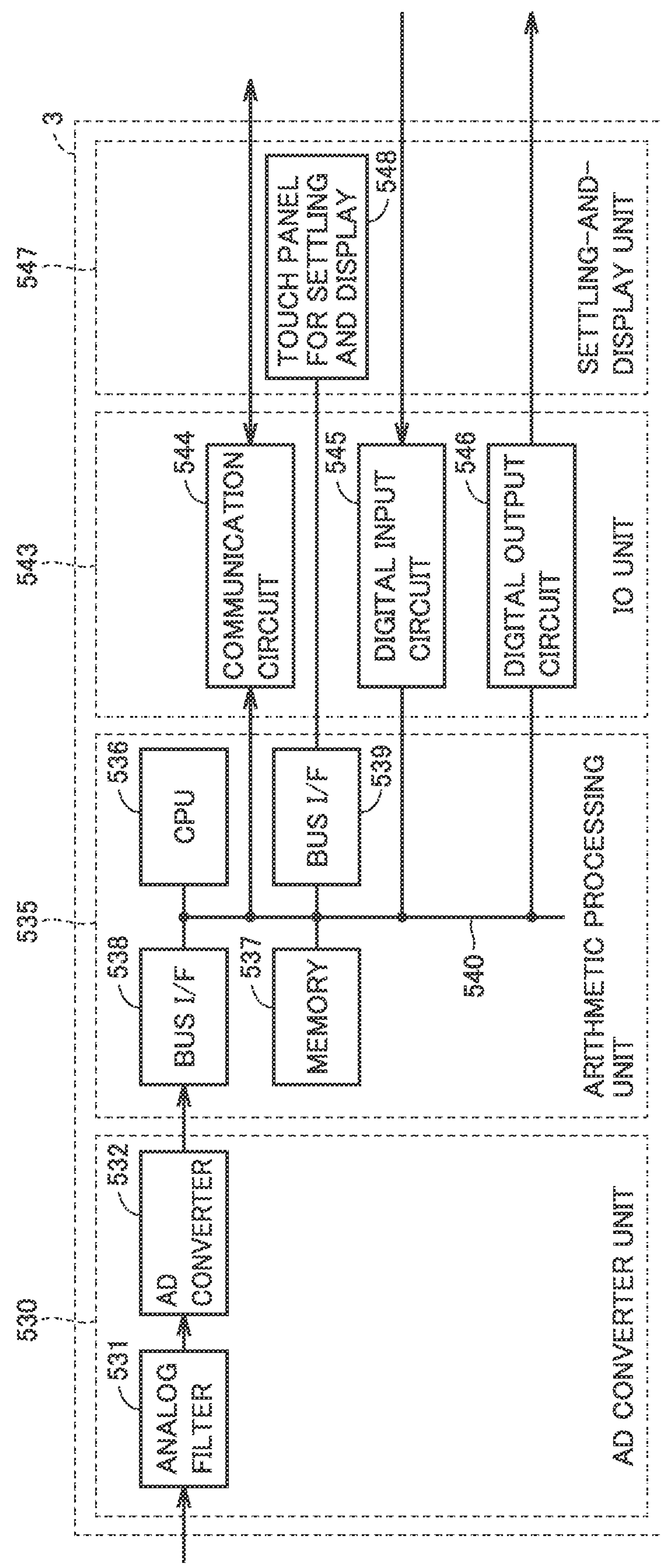
FIG. 13 is a block diagram showing respective one example hardware configuration of a supervisory controller 38 and a converter controller 35.

FIG. 13 is a block diagram showing respective one example hardware configuration of supervisory controller 38 and converter controller 35.

Supervisory controller 38 and converter controller 35 have the same configuration as, what is called, a digital relay device. Supervisory controller 38 and converter controller 35 each include an analog-to-digital (AD) converter unit 530, an arithmetic processing unit 535, an input/output (IO) unit 543, and a settling-and-display unit 547.

As preceding devices followed by AD converter unit 530, multiple transformers (not shown) may be disposed for converting the signals, input from the detectors, to voltage levels appropriate for signal processing performed in controller 3.

AD converter unit 530 includes an analog filter 531 and an AD converter 532. Analog filter 531 is a low-pass filter provided to remove an aliasing error in AD conversion. AD converter 532 converts the signal, passed through analog filter 531, into a digital value.

While FIG. 13 representatively shows only one channel as the input to AD converter unit 530, AD converter unit 530, in practice, has a multiple-input configuration to receive the signals from the respective detectors. Accordingly, more specifically, AD converter unit 530 includes multiple analog filters 531, and a multiplexer (not shown) for selecting signals having passed through analog filters 531.

Arithmetic processing unit 535 includes a central processing unit (CPU) 536, a memory 537, bus interfaces 538, 539, and a bus 540 connecting these components. CPU 536 controls the entire operation of supervisory controller 38 or converter controller 35. Memory 537 is used as a primarily storage for CPU 536. Furthermore, by including a nonvolatile memory, such as a flash memory, memory 537 stores programs, and settings values for the signal processing.

Note that arithmetic processing unit 535 may be configured of any circuit that has computing functionality, and is not limited to the example of FIG. 13. For example, arithmetic processing unit 535 may include multiple CPUs. Instead of the processor, such as CPU, arithmetic processing unit 535 may be configured of at least one ASIC (Application Specific Integrated Circuit), or at least one FPGA (Field Programmable Gate Array). Alternatively, arithmetic processing unit 535 may be configured of any combination of the processor, ASIC, and FPGA.

IO unit 543 includes a communication circuit 544, a digital input circuit 545, and a digital output circuit 546. Communication circuit 544 transmits and receives an optical signal or a radio signal. Digital input circuit 545 and digital output circuit 546 are interface circuits for communications between CPU 536 and external devices.

Settling-and-display unit 547 includes a touch panel 548 for inputting settling values and for display. Touch panel 548 is an input/output interface which is a combination of a visual display, such as a liquid crystal panel, and an input device, such as a touchpad. Touch panel 548 is connected to bus 540 via a bus interface 539.

Embodiment 2

Figure 14:
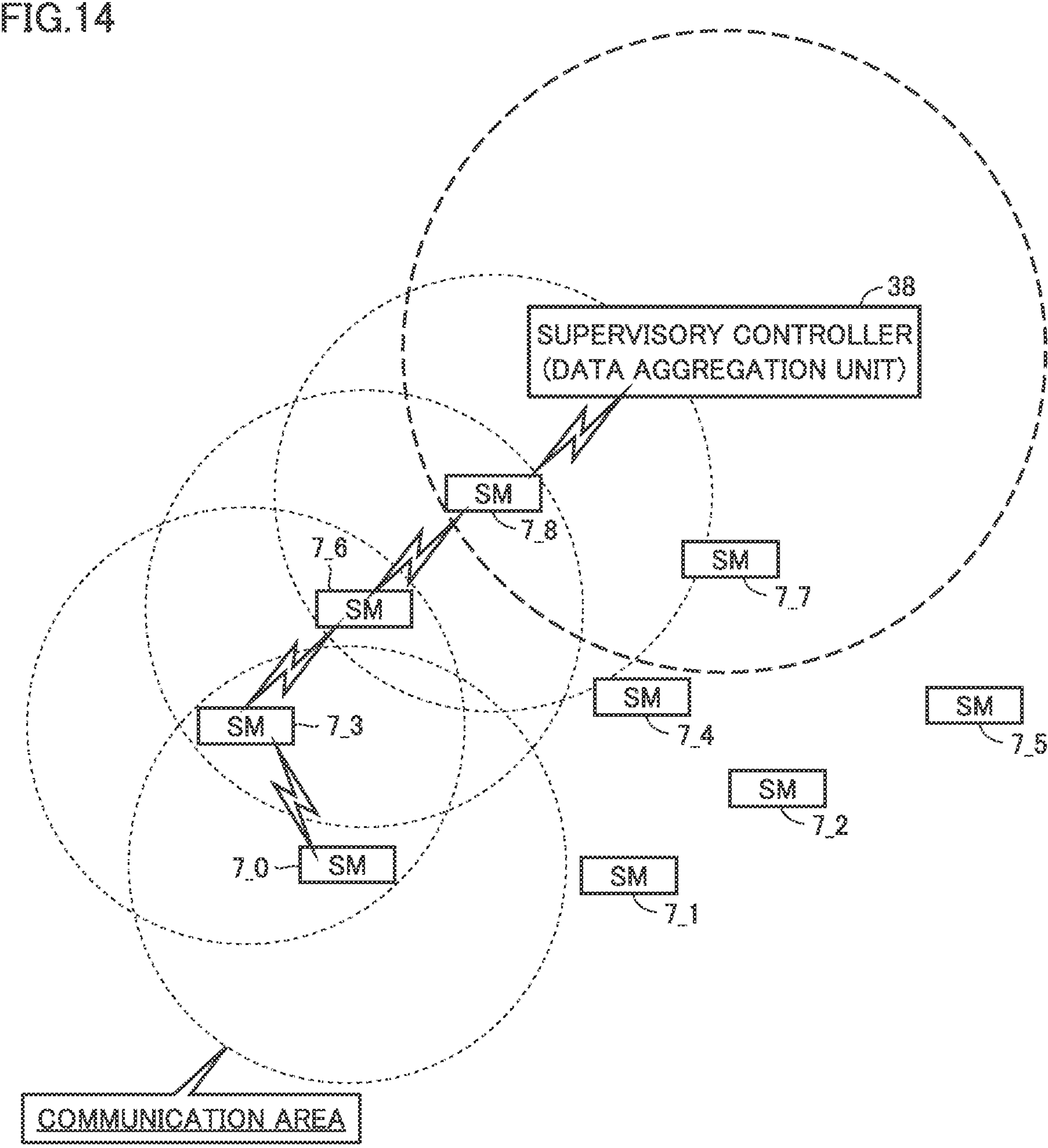
FIG. 14 is a diagram showing wireless communications performed by a power conversion device 1 according to Embodiment 2.

FIG. 14 is a diagram showing wireless communications by a power conversion device 1 according to Embodiment 2.

The communication over a wireless communication channel between a supervisory controller 38 and a unit converter 7 is a multi-hop wireless communication. Information on at least one condition of a unit converter is transferred in order, via other unit converters located between supervisory controller 38 and the unit converter 7.

For example, suppose that unit converter 7_0 is a source device. Inbound frames FU2, FU4, FU6, FU12, FU13 directed to supervisory controller 38 are transmitted from unit converter 7_0 to supervisory controller 38 via unit converter 7_3, unit converter 7_6, and unit converter 7_8.

Suppose that unit converter 7_0 is a destination device. Outbound frames FD5, FD6 directed to unit converter 7_0 are transmitted from supervisory controller 38 to unit converter 7_0 via unit converter 7_8, unit converter 7_6, and unit converter 7_3.

The presently disclosed embodiments should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

1 power conversion device; 2 power converter circuit; 3 controller; 4*u*, 4*v*, 4*w* leg circuit; 5 upper arm; 6 lower arm; 7 unit converter; 8A, 8B reactor; 9A, 9B arm current detector; 10 AC voltage detector; 11A, 11B DC voltage detector; 12 AC circuit; 13 interconnection transformer; 14 DC circuit; 16 AC current detector; 20HB converter circuit; 21 SM control unit; 22A, 22B switching element; 23A, 23B diode; 24 DC capacitor; 26P, 26N input-output terminal; 27 voltage detector; 28 information communications unit; 29 current detector; 35 converter controller; 37 command generator; 38 supervisory controller; 60 DC voltage controller; 61 AC voltage controller; 62 circulating current controller; 63 capacitor voltage controller; 64 arm voltage controller; 70 relay device; 71 optical communications unit; 72 wireless communications unit; 104 phase generator; 106 phase adjuster; 108 PWM signal generator; 110 gate driver; 122 condition management unit; 123 test controller; 124 bypass controller; 530 AD converter unit; 531 analog filter; 532 AD converter; 535 arithmetic processing unit; 536 CPU; 537 memory; 538, 539 bus I/F; 540 bus; 543 IO unit; 544 communication circuit; 545 digital input circuit; 546 digital output circuit; 547 settling-and-display unit; 548 touch panel for settling and display; SW bypass switch; FC1, FC2 optical fiber; RC wireless communication channel; and EC wired electrical communication channel.

The invention claimed is:

1. A power conversion device for converting power between a direct-current (DC) circuit and an alternating-current (AC) circuit, the power conversion device comprising:

a power converter circuit which includes a plurality of unit converters connected in series; and a controller, wherein each unit converter of the plurality of unit converters includes one or more switching elements and a capacitor, the controller transmits, to the unit converter through a first transmission medium, information on a switching command for the unit converter, the unit converter transmits, to the controller through a second transmission medium, information on at least one condition of the unit converter, and the first transmission medium is an optical fiber, and the second transmission medium is a wireless communication channel.

2. The power conversion device according to claim 1, wherein the controller transmits, to the unit converter through the first transmission medium and the second transmission medium, information on communications abnormality or abnormality in the controller.

3. The power conversion device according to claim 2, wherein the controller includes:

a supervisory controller;

a converter controller connected to the supervisory controller over a third transmission medium; and a relay device connected to the plurality of unit converters over the first transmission medium, and connected to the converter controller over another first transmission medium, wherein the third transmission medium is a wired electrical communication channel, the supervisory controller transmits, to the unit converter via the converter controller and the relay device, the information on communications abnormality or abnormality in the controller, the supervisory controller transmits, to the unit converter through the second transmission medium, the information on communications abnormality or abnormality in the controller, the information on communications abnormality or abnormality in the controller includes at least one of: information indicative of presence or absence of abnormality in the supervisory controller; information indicative of presence or absence of abnormality in the converter controller; information indicative of presence or absence of an CRC error; information indicative of presence or absence of non-detection of light quantity of the optical fiber; and information indicative of presence or absence of communication timeout.

4. The power conversion device according to claim 1, wherein the unit converter transmits, to the controller through the first transmission medium and the second transmission medium, information on a condition of the unit converter which changes on the switching command.

5. The power conversion device according to claim 4, wherein the controller includes:

a supervisory controller;

a converter controller connected to the supervisory controller over a third transmission medium; and a relay device which is connected to the plurality of unit converters over the first transmission medium, and connected to the converter controller over another first transmission medium, wherein the third transmission medium is a wired electrical communication channel, the unit converter transmits, to the relay device, information indicative of a first condition of the unit converter which changes on the switching command, the relay device transmits, to the supervisory controller via the converter controller, aggregated information of first conditions of the plurality of unit converters, the unit converter transmits, to the supervisory controller through the second transmission medium, the information indicative of the first condition, the information indicative of the first condition includes at least one of information indicative of a capacitor voltage of the unit converter and information indicative of a passing current of the unit converter, and the aggregated information of the first conditions includes at least one of information indicative of a sum or average of capacitor voltages of the plurality of unit converters and information indicative of a sum or average of passing currents of the plurality of unit converters.

6. The power conversion device according to claim 4, wherein the controller includes:

a supervisory controller;

a converter controller connected to the supervisory controller over a third transmission medium; and a relay device connected to the plurality of unit converters over the first transmission medium, and connected to the converter controller over another first transmission medium, wherein the third transmission medium is a wired electrical communication channel, the unit converter transmits, to the relay device, information indicative of a second condition of the unit converter which changes on the switching command, the relay device transmits, to the supervisory controller via the converter controller, aggregated information of second conditions of the plurality of unit converters, the unit converter transmits, to the supervisory controller through the second transmission medium, the information indicative of the second condition, the information indicative of the second condition includes at least one of: information indicative of a gate-blocked state of the unit converter; information indicative of a gate-deblocked state of the unit converter; and information indicative of an operational state of the unit converter, and the aggregated information of the second conditions includes at least one of: information indicative of a logical AND of gate-blocked states of the plurality of unit converters; information indicative of a logical AND of gate-deblocked states of the plurality of unit converters; and information indicative of a logical AND of operational states of the plurality of unit converters.

7. The power conversion device according to claim 1, wherein the unit converter includes a bypass switch for short-circuiting the unit converter, the unit converter transmits, to the controller through the first transmission medium and the second transmission medium, information on communication timeout or severe abnormality in the unit converter, and after transmitting the information, the unit converter closes the bypass switch.

8. The power conversion device according to claim 7, wherein the controller includes:

a supervisory controller;

a converter controller connected to the supervisory controller over a third transmission medium; and a relay device connected to the plurality of unit converters over the first transmission medium, and connected to the converter controller over another first transmission medium, wherein the third transmission medium is a wired electrical communication channel, the unit converter transmits, to the relay device, the information on communication timeout or severe abnormality in the unit converter, the relay device transmits, to the supervisory controller via the converter controller, aggregated information of communication timeouts or severe abnormalities in the plurality of unit converters, the unit converter transmit, to the supervisory controller through the second transmission medium, the information on communication timeout or severe abnormality in the unit converter, the information on communication timeout or severe abnormality in the unit converter includes at least one of: information indicative of presence or absence of communication timeout; information indicative of presence or absence of abnormality in a power supply for the unit converter; information indicative of presence or absence of abnormality in a clock included in the unit converter; and information indicative of presence or absence of severe abnormality in a capacitor voltage of the unit converter, and the aggregated information of communication timeouts or severe abnormalities in the plurality of unit converters includes at least one of: information indicative of a logical OR of presence or absence of communication timeouts of the plurality of unit converters; information indicative of a logical OR of presence or absence of abnormalities in power supplies for the plurality of unit converters; information indicative of a logical OR of presence or absence of abnormalities in clocks included in the plurality of unit converters; and information indicative of a logical OR of presence or absence of severe abnormalities in capacitor voltages of the plurality of unit converters.

9. The power conversion device according to claim 1, wherein the unit converter includes a bypass switch for short-circuiting the unit converter, the unit converter transmits, to the controller through the first transmission medium, information on instantaneous abnormality in communication over the first transmission medium, and after transmitting the information, the unit converter closes the bypass switch.

10. The power conversion device according to claim 9, wherein the controller includes:

a supervisory controller;

a converter controller connected to the supervisory controller over a third transmission medium; and a relay device connected to the plurality of unit converters over the first transmission medium, and connected to the converter controller over another first transmission medium, wherein the third transmission medium is a wired electrical communication channel, the unit converter transmits, to the relay device, the information on the instantaneous abnormality in the communication over the first transmission medium, the relay device transmits, to the supervisory controller via the converter controller, aggregated information of instantaneous abnormalities in communications performed by the plurality of unit converters over the first transmission medium, the unit converter does not transmit, to the controller through the second transmission medium, the instantaneous abnormality in the communication over the first transmission medium, the information on the instantaneous abnormality in the communication over the first transmission medium includes at least one of: information indicative of presence or absence of an CRC error in the communication over the first transmission medium; information indicative of presence or absence of non-detection of light quantity of the optical fiber; and information indicative of presence or absence of an FCS error in the communication over the first transmission medium, and the aggregated information of the instantaneous abnormalities in the communication over the first transmission medium includes at least one of: information indicative of a logical OR of presence or absence of CRC errors in the plurality of unit converters; information indicative of a logical OR of presence or absence of non-detections of light quantities of optical fibers of the plurality of unit converters; and information indicative of a logical OR of presence or absence of FCS errors of the plurality of unit converters.

11. The power conversion device according to claim 1, wherein the controller transmits, to the unit converter through the second transmission medium, information on a test command for the unit converter.

12. The power conversion device according to claim 1, wherein the unit converter includes a bypass switch for short-circuiting the unit converter, the unit converter transmits, to the controller through the second transmission medium, information on slight abnormality in the unit converter, and after transmitting the information, the unit converter does not close the bypass switch.

13. The power conversion device according to claim 12, wherein the information on slight abnormality in the unit converter includes at least one of: information indicative of presence or absence of a slight excess of a capacitor voltage of the unit converter; information indicative of presence or absence of a slight deficit in the capacitor voltage of the unit converter; and information indicative of presence or absence of abnormality in recording functionality of the unit converter.

14. The power conversion device according to claim 1, wherein the unit converter transmits, to the controller through the second transmission medium, information on a condition of the unit converter irrelevant to the switching command.

15. The power conversion device according to claim 14, wherein the unit converter includes a bypass switch for short-circuiting the unit converter, and the information on the condition of the unit converter irrelevant to the switching command includes at least one of: information indicative of a condition of the bypass switch; information indicative of answerback to the switching command; and recorded data of the unit converter.

16. The power conversion device according to claim 1, wherein the controller includes:

a converter controller; and a relay device which is connected to the plurality of unit converters over the first transmission medium and connected to the converter controller over another first transmission medium, wherein during operation of the power converter circuit, the converter controller transmits, to the unit converter via the relay device, information on a first switching command for the unit converter, the information on the first switching command includes at least one of a voltage command, a carrier signal, a pulse signal, and a synchronization signal.

17. The power conversion device according to claim 1, wherein the controller includes:

a converter controller; and a relay device which is connected to the plurality of unit converters over the first transmission medium, and connected to the converter controller over another first transmission medium, wherein during initial settings of the power converter circuit, the converter controller transmits, to the unit converter via the relay device, information on a second switching command for the unit converter, and the information on the second switching command includes at least one of an identification signal of the unit converter, common phase offset, and a total number of unit converters to be controlled among the plurality of unit converters.

18. The power conversion device according to claim 1, wherein the controller includes:

a supervisory controller;

a converter controller connected to the supervisory controller over a third transmission medium; and a relay device connected to the plurality of unit converters over the first transmission medium, and connected to the converter controller over another first transmission medium, wherein the third transmission medium is a wired electrical communication channel, the supervisory controller transmits, to the unit converter via the converter controller and the relay device, information on a third switching command for the unit converter, and the information on the third switching command includes at least one of a gate block command and a gate deblock command.

19. The power conversion device according to claim 1, wherein communication for the information on the at least one condition of the unit converter over the second transmission medium between the controller and the unit converter is a multi-hop wireless communication, which transfers the information via other unit converters that are intervening between the controller and the unit converter among the plurality of unit converters.

* * * * *